United States Patent
Groves et al.

(10) Patent No.: US 12,548,460 B2
(45) Date of Patent: Feb. 10, 2026

(54) EQUIPOTENTIAL ZONE (EPZ) GROUNDING TRAINING LAB

(71) Applicant: Grid Manufacturing Corporation, Meridian, ID (US)

(72) Inventors: Mark James Groves, Meridian, ID (US); Dean Coriell, Indian Valley, ID (US); Joseph Wiley, Meridian, ID (US); Phillip Lee Carrillo, Boise, ID (US); Aaron Howell, Boise, ID (US); Ole James Groves, Meridian, ID (US); John Michael Perez, Mundelein, IL (US); Matthew Clayton Compher, The Woodlands, TX (US)

(73) Assignee: Quanta Associates, L.P., Houston, TX (US)

(*) Notice: Subject to any disclaimer, the term of this patent is extended or adjusted under 35 U.S.C. 154(b) by 1052 days.

(21) Appl. No.: 17/586,368

(22) Filed: Jan. 27, 2022

(65) Prior Publication Data
US 2022/0246053 A1    Aug. 4, 2022

Related U.S. Application Data

(60) Provisional application No. 63/143,384, filed on Jan. 29, 2021.

(51) Int. Cl.
G09B 9/00    (2006.01)
G09B 1/32    (2006.01)
G09B 1/40    (2006.01)

(52) U.S. Cl.
CPC ............... *G09B 9/00* (2013.01); *G09B 1/325* (2013.01); *G09B 1/40* (2013.01)

(58) Field of Classification Search
CPC . G09B 1/40; G09B 1/325; G09B 9/00; G09B 19/003
See application file for complete search history.

(56) References Cited

U.S. PATENT DOCUMENTS

| 4,932,623 | A | * | 6/1990 | Reisdorff | H02G 7/20 |
| | | | | | 248/219.3 |
| 6,048,208 | A | * | 4/2000 | Hoover | G09B 23/188 |
| | | | | | 434/226 |
| 6,223,479 | B1 | * | 5/2001 | Stockli | E04B 1/3444 |
| | | | | | 52/68 |

(Continued)

FOREIGN PATENT DOCUMENTS

| CN | 203352451 U | * | 12/2013 |
| JP | 2006177765 A | * | 7/2006 |

(Continued)

*Primary Examiner* — Dmitry Suhol
*Assistant Examiner* — Julie Grace Dosher
(74) *Attorney, Agent, or Firm* — Knobbe, Martens, Olson & Bear, LLP

(57) ABSTRACT

Training labs for training linemen and other power or utility technicians are disclosed. The training labs can be configured to provide equipotential zone (EPZ) grounding training in overhead and/or underground power scenarios. In some instances, the training labs can be mobile. For example, a mobile training lab can comprise an overhead training side that comprises one more deployable overhead power poles and/or an underground side comprising one or more component cabinets.

19 Claims, 30 Drawing Sheets

(56) References Cited

U.S. PATENT DOCUMENTS

| | | | |
|---|---|---|---|
| 6,428,073 B1 * | 8/2002 | Blodgett, Jr. | B60P 3/34 296/26.14 |
| 6,696,925 B1 * | 2/2004 | Aiello, Jr. | H01F 27/002 340/310.17 |
| 2008/0100282 A1 * | 5/2008 | Crick | G01R 27/18 324/140 D |
| 2009/0058433 A1 * | 3/2009 | Browne | G01R 27/205 324/715 |
| 2011/0207097 A1 * | 8/2011 | Lumry | G09B 25/02 434/219 |
| 2012/0144762 A1 * | 6/2012 | Eatock | G09B 19/00 52/79.5 |
| 2013/0075194 A1 * | 3/2013 | Hagberg | E04G 5/067 182/113 |
| 2021/0390880 A1 * | 12/2021 | Groves | B62D 53/08 |

FOREIGN PATENT DOCUMENTS

| | | | | |
|---|---|---|---|---|
| KR | 2009089232 A * | 8/2009 | | |
| WO | WO-2009014457 A1 * | 1/2009 | | H02G 1/02 |
| WO | WO-2013101319 A1 * | 7/2013 | | G09B 23/18 |
| WO | WO-2014177880 A2 * | 11/2014 | | A62C 99/0081 |

* cited by examiner

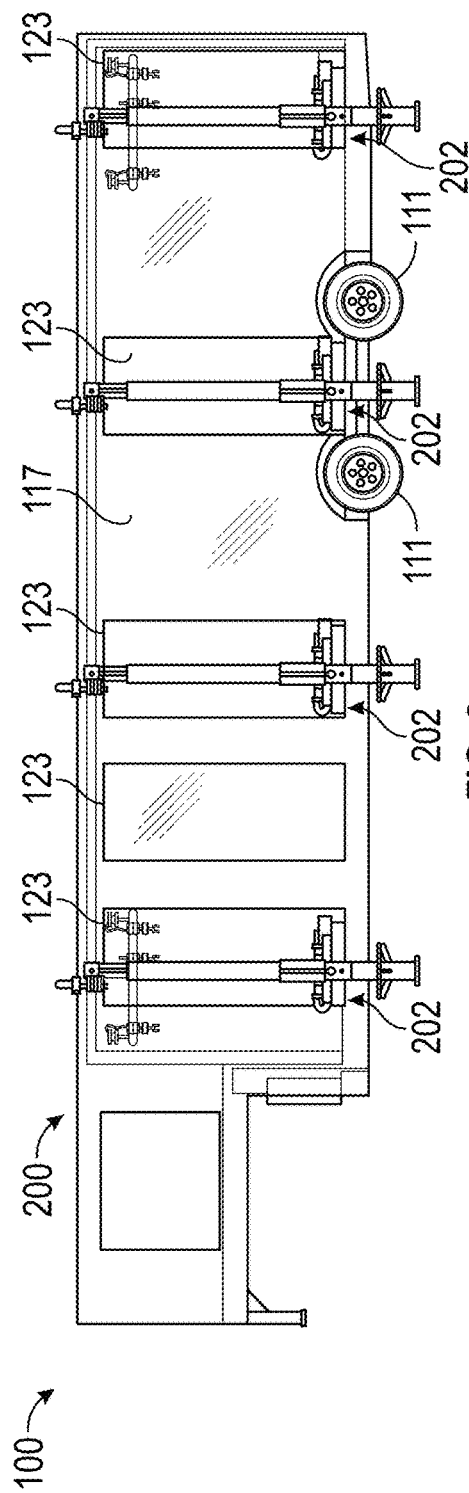
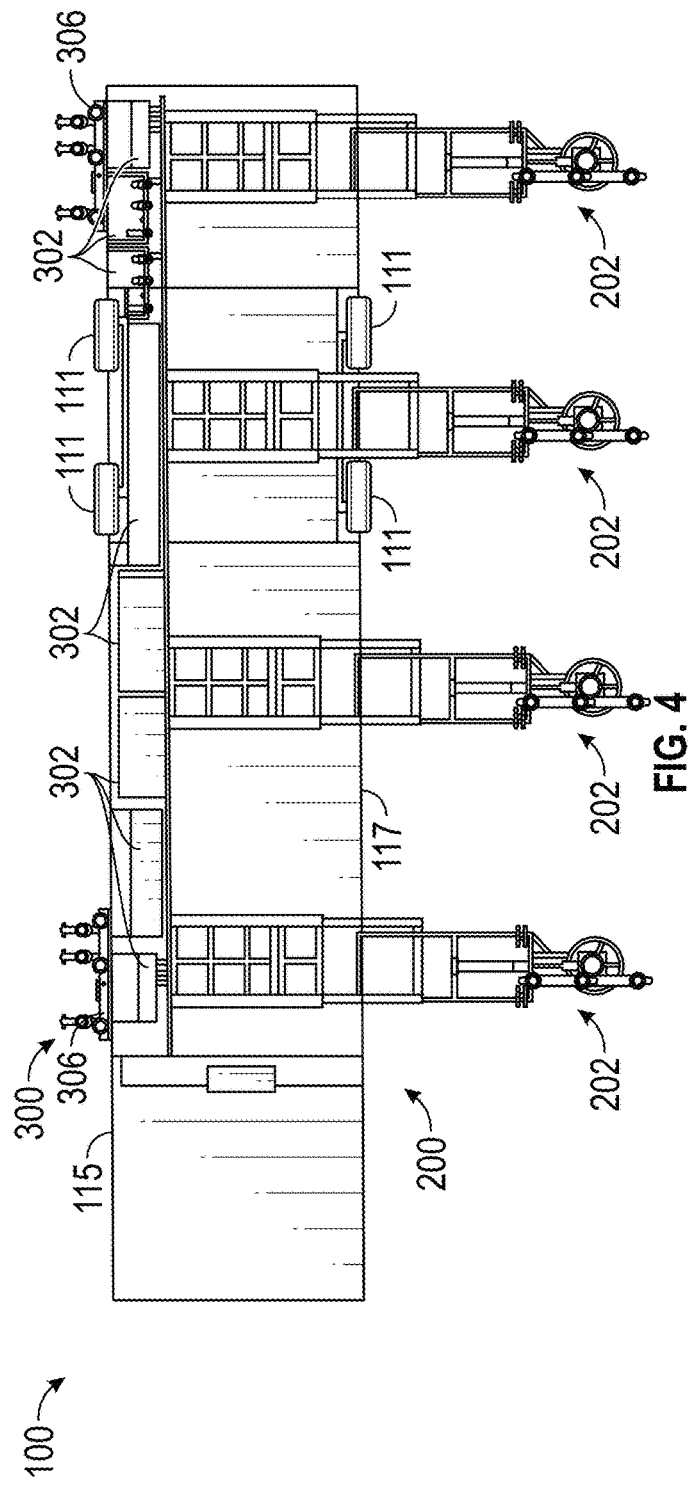
FIG. 3
FIG. 4

EQUIPOTENTIAL ZONE (EPZ) GROUNDING TRAINING LAB

PRIORITY APPLICATIONS

This application claims priority to U.S. Provisional Application No. 63/143,384, filed Jan. 29, 2021, and which is incorporated herein by reference. Any and all applications for which a foreign or domestic priority claim is identified in the Application Data Sheet as filed with the present application are hereby incorporated by reference under 37 CFR 1.57.

BACKGROUND

Field

This application relates to a training lab for providing instruction and training related to equipotential zone (EPZ) grounding. In particular, this application relates to a training lab configured to provide instruction and training related to EPZ grounding for overhead and/or underground power line applications.

Description

Electric workers, such as linemen, often use grounding systems while working on power lines or other electrical components in order to protect themselves against electric shock, which in some cases, can be fatal. In general, the grounding systems are designed to place the electric working in an equipotential zone that protects the worker from electric shock. Equipotential zones eliminate the possibility of current flowing across the worker's body. Establishing grounding to create an equipotential zone is thus extremely important.

SUMMARY

In one aspect, a training lab for providing EPZ grounding training is disclosed. The mobile training lab can include at least one electrically isolated power pole assembly configured to support a power line; a three-phase power source configured to selectively energize the power line; and a lineman meter configured for use during EPZ grounding training. The lineman meter can include an arm lead; a leg lead; an internal resistor positioned between the arm lead and the leg lead and that approximates a resistance of a human body; and at least one indicator configured to indicate proper or improper grounding.

The training lab can include one or more of the following features in any combination: (a) wherein the lineman meter is configured to be attached to the power line and the power pole assembly using the arm lead and the leg lead to provide EPZ grounding training; (b) wherein the power pole assembly further comprises a foot portion comprising a support ring configured to support a trainee above the ground; (c) a cross-arm configured to couple to a top of the at least one power pole assembly, the cross-arm configured to receive and support one or more power lines; (d) a towable trailer comprising a body having a plurality of walls at least partially defining a hollow interior, an axle having at least two wheels disposed thereon to support the body, and a tow hitch, and the at least one power pole assembly is configured to transition between a stowed configuration positioned within the hollow interior and a deployed configuration in which a power pole of the power pole assembly is deployed adjacent to the towable trailer for providing EPZ grounding training; (e) wherein the at least one power pole assembly comprises a slide extension assembly mounted within the hollow interior and configured to slide out an access location in the deployed configuration, a pivot assembly comprising a hinge attached to the slide extension assembly, and an extendible pole assembly attached to the hinge of the pivot assembly; (f) the pivot assembly is configured to allow the extendible pole assembly to pivot between an inclined storage configuration and a vertical deployed configuration; (g) wherein the extendible pole assembly comprises an outer pole and an inner pole telescopingly arranged therein; (h) wherein the pivot assembly further comprises an insulated coupling that couples the extendible pole assembly to the slide extension assembly and electrically insulates the extendible pole assembly from a remainder of the mobile training lab; (i) wherein the at least one power pole assembly comprises four power pole assemblies arranged on an overhead training side of the trailer; (j) an underground training side positioned on an opposite side of the trailer; (k) wherein the underground training side comprises at least one of a single-phase transformer, a three-phase transformer, a three-phase load-break junction box, a three-phase splice cabinet, and a live front switch; and/or other features as described throughout this application.

In another aspect, a training lab for providing EPZ grounding training is disclosed. The training lab can include at least one electrically isolated cabinet comprising a single-phase or a three-phase transformer; a three-phase power source configured to selectively energize the single-phase or the three-phase transformer; and a lineman meter configured for use during EPZ grounding training. The lineman meter can include an arm lead; a leg lead; an internal resistor positioned between the arm lead and the leg lead and that approximates a resistance of a human body; and at least one indicator configured to indicate proper or improper grounding.

The training lab can include one or more of the following features in any combination: (a) additional cabinets comprising at least one or more of a single-phase transformer, a three-phase transformer, a three-phase load-break junction box, a three-phase splice cabinet, and a live front switch; (b) wherein the cabinets are provided on an underground side of a trailer configured to provide EPZ grounding and switching training; (c) an overhead training side positioned on an opposite side of the trailer; (d) wherein the overhead training side comprises at least one power pole assembly configured to transition between a stowed configuration positioned within the hollow interior and a deployed configuration in which a power pole of the power pole assembly is deployed adjacent to the towable trailer for providing EPZ grounding training; (e) wherein the at least one power pole assembly comprises a slide extension assembly mounted within the hollow interior and configured to slide out an access location in the deployed configuration, a pivot assembly comprising a hinge attached to the slide extension assembly, and an extendible pole assembly attached to the hinge of the pivot assembly; (f) wherein the at least one power pole assembly comprises four power pole assemblies arranged on the overhead training side of the trailer; and/or or other features as described throughout this application.

In another aspect, a mobile training lab for providing EPZ grounding training is disclosed. The mobile training lab includes: a towable trailer comprising a body having a plurality of walls at least partially defining a hollow interior, an axle having at least two wheels disposed thereon to support the body, and a tow hitch; and at least one power pole assembly configured to transition between a stowed configuration positioned within the hollow interior and a deployed configuration in which a power pole of the power pole assembly is deployed adjacent to the towable trailer for providing EPZ grounding training.

The mobile training lab can include one or more of the following features in any combination: (a) wherein the at least one power pole assembly comprises a slide extension assembly mounted within the hollow interior and configured to slide out an access location in the deployed configuration, a pivot assembly comprising a hinge attached to the slide extension assembly, and an extendible pole assembly attached to the hinge of the pivot; (b) the pivot assembly is configured to allow the extendible pole assembly to pivot between an inclined storage configuration and a vertical deployed configuration; (c) wherein the extendible pole assembly comprises an outer pole and an inner pole telescopingly arranged therein; (d) a cross-arm configured to couple to a top of the extendible pole assembly, the cross-arm configured to receive and support one or more power lines; (e) a three-phase power source configured to energize the one or more power lines; (f) wherein the extendible pole assembly further comprises a foot portion comprising a support ring configured to support a trainee above the ground; (g) wherein the pivot assembly further comprises an insulated coupling that couples the extendible pole assembly to the slide extension assembly and electrically insulates the extendible pole assembly from a remainder of the mobile training lab; (h) wherein the at least one power pole assembly comprises four power pole assemblies arranged on an overhead training side of the mobile training lab; (i) an underground training side positioned on an opposite side of the mobile training lab; (j) wherein the underground training side comprises at least one of a single-phase transformer, a three-phase transformer, a three-phase load-break junction box, a three-phase splice cabinet, and a live front switch; and/or other features as described herein.

In another aspect, a mobile training lab for providing EPZ grounding training includes: a towable trailer comprising a body having a plurality of walls at least partially defining a hollow interior, an axle having at least two wheels disposed thereon to support the body, and a tow hitch; at least one cabinet electrically isolated from the towable trailer and comprising a single-phase or a three-phase transformer; and a three-phase power source configured to energize the single-phase or the three-phase transformer.

The mobile training lab can include one or more of the following features in any combination: (a) wherein the at least one cabinet is attached to a frame, and wherein an insulation block is positioned between the at least one cabinet and the frame to electrically isolate the cabinet from a remainder of the mobile training lab; (b) additional cabinets comprising at least: a single-phase transformer, a three-phase transformer, a three-phase load-break junction box, a three-phase splice cabinet, and a live front switch; (c) wherein the cabinets are provided on an underground side of the trailer configured to provide EPZ grounding and switching training; (d) an overhead training side positioned on an opposite side of the mobile training lab; (e) wherein the overhead training side comprises at least one power pole assembly configured to transition between a stowed configuration positioned within the hollow interior and a deployed configuration in which a power pole of the power pole assembly is deployed adjacent to the towable trailer for providing EPZ grounding training; (f) where the at least one power pole assembly comprises a slide extension assembly mounted within the hollow interior and configured to slide out an access location in the deployed configuration, a pivot assembly comprising a hinge attached to the slide extension assembly, and an extendible pole assembly attached to the hinge of the pivot assembly; (g) wherein the at least one power pole assembly comprises four power pole assemblies arranged on the overhead training side of the mobile training lab; and/or other features as described herein.

In another aspect, a lineman meter configured for use during EPZ grounding training is disclosed, the lineman meter comprising: a first arm lead; a second arm lead; at least one leg lead; an internal resistance that approximates a human body; and at least one indicator configured to indicate proper or improper grounding.

The systems, methods and devices of this disclosure each have several innovative aspects, no single one of which is solely responsible for the desirable attributes disclosed herein.

BRIEF DESCRIPTION OF THE DRAWINGS

The features and advantages of the devices, systems, and methods of the training labs described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be to scale.

In FIGS. 1 and 2, the training lab is illustrated in a transport configuration.

FIGS. 3-5 illustrate the mobile training lab of FIGS. 1 and 2 in an example deployed configuration for providing overhead and underground EPZ grounding training.

FIG. 3 illustrates a left side of the mobile training lab configured for providing overhead EPZ grounding training. In the illustrated embodiment, four power pole assemblies are deployed from the left side of the mobile training lab.

FIG. 4 is a top view of the mobile training lab in the example deployed configuration. As show, the four power pole assemblies are deployed from the left size of the mobile training lab.

FIG. 5 is a right-side view of the mobile training lab configured for providing underground EPZ grounding training. In the illustrated embodiment, the right side of the mobile training lab has been opened to provide access to various electrical equipment mounted within the mobile training lab.

In FIG. 17A, the cross-arm assembly is illustrated in a deployed configuration.

In FIG. 17B, the cross-arm assembly is illustrated in a deployed configuration.

FIG. 22 illustrates a power pole assembly deployed as if at the start of a training scenario, according to an embodiment.

FIG. 23 illustrates example connection cables that can be used to set up an EPZ as part of the training scenario, according to an embodiment.

FIG. 24 illustrates a grounding connection on the power pole assembly, according to an embodiment.

DETAILED DESCRIPTION

Figure 1:
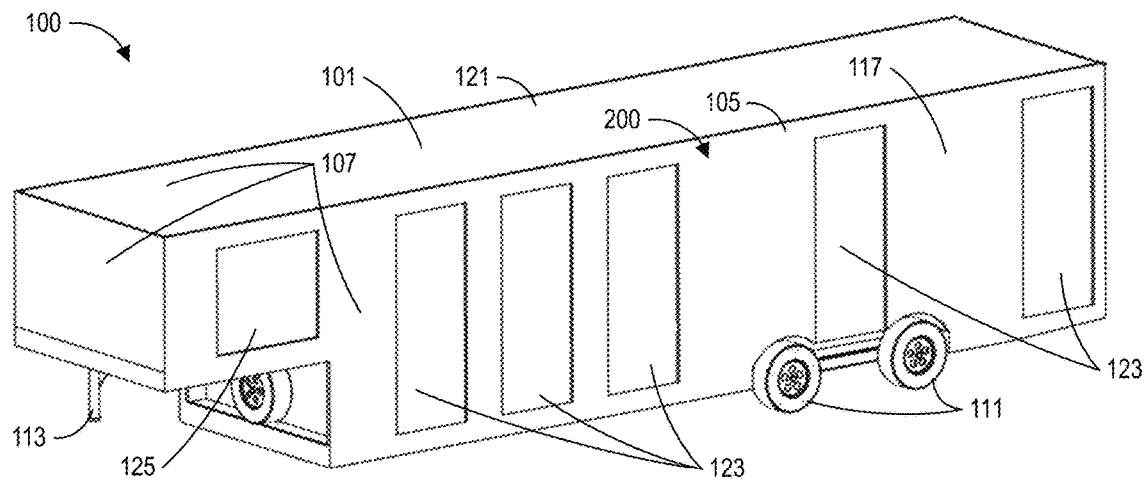
FIGS. 1 and 2 are right and left perspective views of an embodiment of mobile training lab configured for providing overhead and underground EPZ grounding training.

Disclosed herein are embodiments of training labs (e.g., training units or training modules) for linemen or other power or utility technicians. In some embodiments, the training labs are configured to be mobile; however, this need not be the case in all embodiments. For example, the training labs can also be provided as stationary structures, which can either be permanent or movable. The training labs can be configured to provide training and/or testing related to a wide variety of concepts and skills that are needed for working with dangerous power lines and related components in both overhead and underground power line applications. In particular, the training labs can be configured to provide training related to EPZ grounding in both overhead and underground power line applications.

Training Lab Overview

FIGS. 1-5 illustrate various views of an embodiment of mobile training lab 100 configured for providing overhead and underground EPZ grounding training. As will be described in more detail below, one side of the mobile training lab 100 can be configured for providing overhead EPZ grounding training (e.g., EPZ grounding training for work on overhead, pole-mounted power lines and other electrical equipment), and another side of the mobile training lab 100 can be configured for providing underground EPZ grounding training (e.g., EPZ grounding training for work on underground or buried power lines and other cabinet mounted electrical equipment positioned on the ground).

In the illustrated embodiments of this application, the left side of the mobile training lab 100 is configured as an overhead training side 200, and the right side of the mobile training lab 100 is configured as an underground training side 300. This can be reversed in other embodiments. Further, in some embodiments, one of the overhead training side 200 and the underground training side 300 can be omitted (or replaced with some other configuration for providing additional forms of training).

The mobile training lab 100 is described as mobile because, as illustrated, the mobile training lab 100 can be configured as a trailer or other portable structure. This allows the mobile training lab 100 to be easily transported to different locations for training. This advantageously allows the mobile training lab 100 to be moved to the people to be trained, rather than requiring those to be trained to come to the training lab. This can increase the availability of training, reduce worker downtime, and provide other benefits as described throughout this application. In some embodiments, the training lab 100 need not be mobile. For example, in some embodiments, the training lab 100 can be configured as a permanent or semi-permanent structure or building or other structure.

In other embodiments, the trailer can be omitted and the components of the training lab 100 can be provided in a non-mobile format. For example, the components of the training lab 100 can be installed in a permanent or semi-permanent training structure. Thus, although the primary example described in this application illustrates the components of the training lab 100 on a trailer, this need not be the case in all embodiments.

Figure 2:
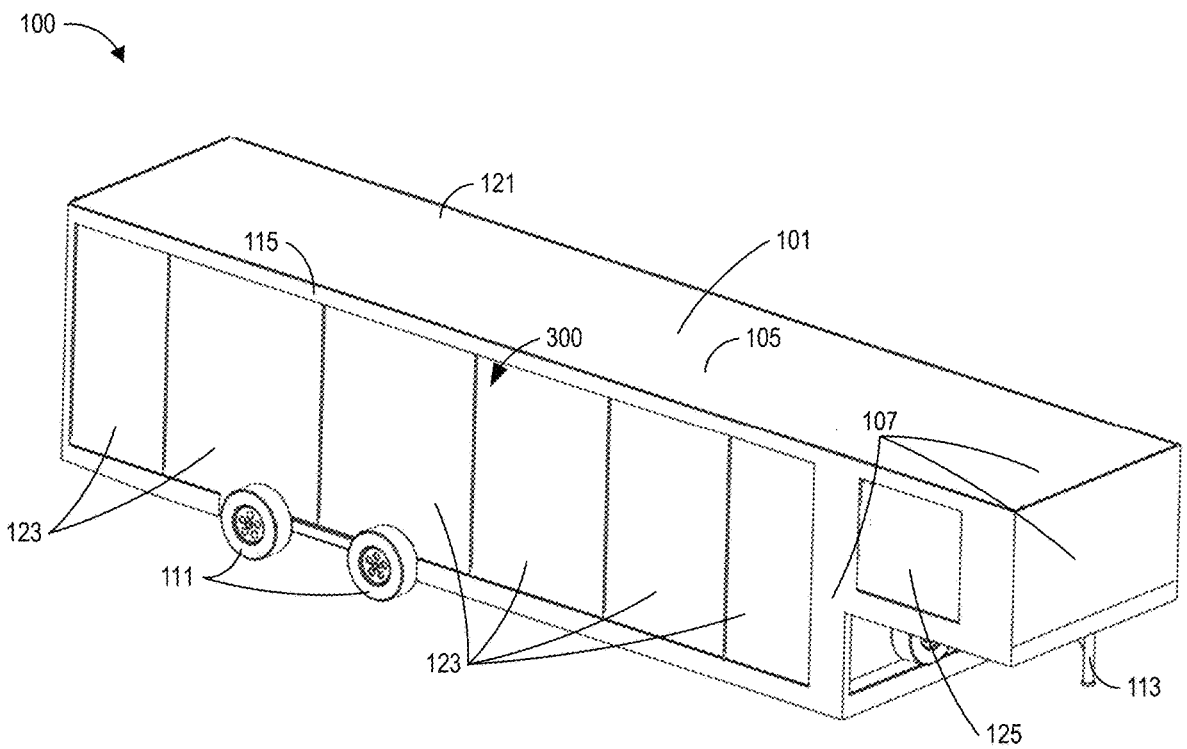
Figure 5:
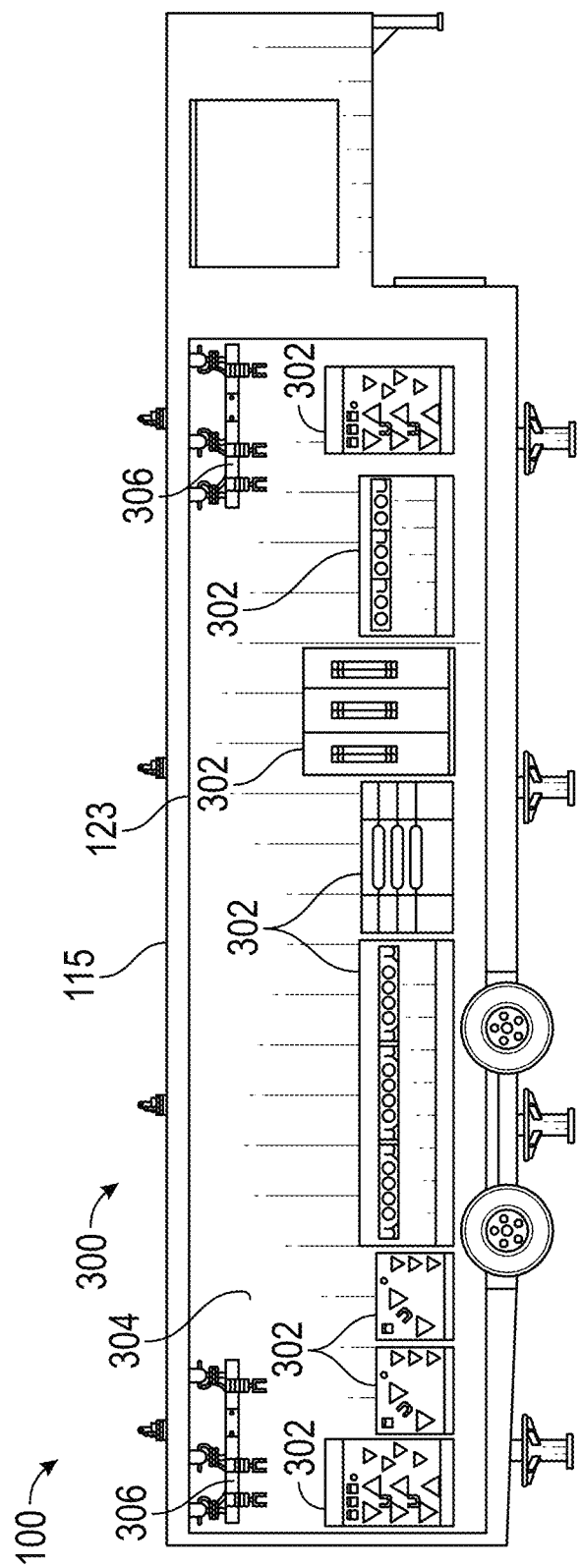

FIGS. 1 and 2 illustrate the mobile training lab 100 in a stowed or transport configuration, while FIGS. 3-5 illustrate the mobile training lab 100 in a deployed or training configuration. In general, the mobile training lab 100 is transitionable between the stowed or transport configuration (FIGS. 1 and 2) and the deployed or training configuration (FIGS. 3-5). As will be described throughout this application, transitioning the mobile training lab 100 between these two configurations can be accomplished, in some embodiments, quickly and easily owing to one or several of the inventive features described throughout this application.

FIGS. 1 and 2 are left and right perspective views of the mobile training lab 100 in the stowed or transport configuration. As is apparent from these views, in some embodiments, in the stowed or transport configuration, the mobile training lab 100 can have the appearance and functionality of a trailer. In the illustrated embodiment, the left side of the mobile training lab 100 comprises an overhead training side 200, and the right side of the mobile training lab 100 comprises an underground training side 300. As shown, however, in the illustrated embodiment of FIGS. 1 and 2, the overhead and underground training components are not visible in the stowed or transport configuration because they are positioned inside of the mobile training lab 100.

In the illustrated embodiment, the mobile training lab 100 comprises a trailer 101. The trailer 101 is configured to be portable (e.g., moveable) such that the mobile training lab 100 can easily be transported to different locations for training and/or testing. As noted above, the mobility of the trailer 101 advantageously allows the mobile training lab 100 to be moved different locations so as to increase access to training. Rather than requiring the trainees to go to a physical training or testing location, the trailer 101 can be brought to the trainees. As one example, the trailer 101 can be transported to a worksite to provide training at the worksite.

As illustrated in FIGS. 1 and 2, the trailer 101 can include a body 105 having a plurality of walls 107 defining a hollow interior, wheels 111, a tow hitch 113, and one or more externally accessible storage areas 125. In the illustrated embodiment, the trailer 101 is configured as an enclosed gooseneck trailer, although this need not be the case in all embodiments. Other types of trailers may also be used. The plurality of walls 107 of the body 105 can include a right lateral wall 115 (FIG. 2), a left lateral wall 117 (FIG. 1), a rear wall, and a roof 121. In the illustrated embodiment, the overhead training side 200 is accessible through the left lateral wall 117 and the underground training side 300 is accessible through the right lateral wall 115. Other configurations are also possible. For example, the overhead side 200 and the underground side 300 can be positioned on or connected to the same wall (e.g., the right lateral wall 115). As another example, the overhead side 200 and the underground side 300 can, in some embodiments, be positioned on or connected to other walls 107 of the trailer 101, such as the rear wall.

The plurality of walls 107 can be arranged so as to define the hollow interior of the trailer 101. The hollow interior can be configured to, for example, provide storage areas for various items, including components of the overhead side 200 and the underground side 300, as will be described in more detail below. As illustrated in FIG. 1, one or more of the plurality of walls 107 can include access locations 123 (e.g., apertures, holes, doorways, access points) to allow access to the hollow interior. Other numbers of access locations 123 and different configurations or locations for the access locations 123 are also possible. The access locations 123 can be provided with doors, such that they can be opened and closed. As will be described in more detail below, when transitioned to the deployed or training configuration, doors of the access locations 123 can be opened to allow access to components of the overhead side 200 and the underground side 300 of the mobile training lab (see, for example, FIGS. 3-5).

The body 105 of the trailer 101 may further comprise structural components such as a frame and/or chassis configured to support the plurality of walls 107 and other components of the trailer 101. As shown in FIGS. 1 and 2, the trailer 101 includes wheels 111 to facilitate movement and transport of the trailer 101. The wheels 111 may be mounted on one or more axles as will be appreciated by those of ordinary skill in the art. In the illustrated embodiment, the trailer 101 comprises two axles, each with a wheel 111 on each lateral side of the trailer 101. Other numbers of axles and wheels 111 may be used as appropriate to support the weight of the trailer 101. As shown in FIGS. 1 and 2, the trailer 101 may be provided in a split axel configuration, which may facilitate accommodation of one or more of the power pole assemblies of the overhead side 200 as will be described in more detail below with reference to FIG. 6.

The trailer 101 further can include the tow hitch 113. The tow hitch 113 can be configured to allow the trailer 101 to be attached to another vehicle, such as a truck, tractor, SUV, etc. Thus, the trailer 101 can be a towable trailer configured to be towed behind another vehicle. In the illustrated embodiment, the tow hitch 113 is configured as a gooseneck hitch, although other types of hitches are possible. For example, the tow hitch 113 can be a bumper pull hitch. In some embodiments, the trailer 101 can include its own engine (gas, diesel, or electric powered) so that the mobile lab 101 can be moved/transported without the use of an additional vehicle.

The trailer 101 may also include any necessary components for driving on public roads, such as turn signals, breaks, mirrors, etc., and can be customized to include some or all of these features as necessary. In some embodiments, the trailer 101 can include legs extending downwards in an extended position. These legs may be adjustable in height and may end in a foot, providing for further stability to the trailer 101. The legs may fold up to the underside of the trailer 101 in a retracted position. In some embodiments, the legs may be retractable and/or telescopic. The legs may be locked in their extended and/or retracted positions. Further, lights can be used on an exterior and/or interior surface of the trailer 101 to provide illumination for individuals who may be operating in nighttime.

In some embodiments, the trailer 101 can be approximately 42 feet long, although other lengths are possible. The trailer 101 can be configured such that, when towed by a vehicle, the total length of the trailer 101 and the vehicle is 65 feet or less. Other lengths, both shorter and longer than 42 or 65 feet, for the trailer 101 or the trailer 101 and the vehicle are also possible. In some embodiments, the trailer 101 can have a weight capacity of at least or greater than 10,000, 11,000, 12,000, 13,000, 14,000, 15,000, 16,000, 17,000, 18,000, 19,000, or 20,000 pounds. In some embodiments, the trailer 101 can be approximately 6, 7, 8, 9, 10, 11, 12, 13, 14, 15, 16, 17, 18, 19, or 20 feet in height. The above dimensions and weight capacities for the trailer 101 are provided by way of example, and other shapes, dimensions, and weight capacities can be used as well as appropriate. In some preferred embodiments, the trailer 101 can be configured such that it can be towed on public roads and highways without requiring special permitting or consideration.

FIGS. 1 and 2 also illustrate that the mobile training lab 100 can include one or more externally accessible storage areas 125. In the illustrated embodiment, two externally accessible storage areas 125 are positioned in the gooseneck of the trailer, although other externally accessible storage areas can additionally or alternatively be provided. Such storage areas 125 can be configured for storage of various items, such as items that will be used during training at the overhead and/or underground sides 200, 300 of the mobile training lab 100. Items that will be used during training at the overhead and/or underground sides 200, 300 of the mobile training lab 100 may also be stored within the hollow interior of the trailer 101. In some embodiments, the exterior of the mobile training lab 100 can be configured for storage and/or attachment of additional components. For example, hot stick hanger brackets can be included on one or both sides of the exterior of the trailer 101.

The mobile training lab 100 can be wired for power. In some embodiments, a power source is provided on the mobile training lab 100. The power source can be, for example, a three-phase power source. In some embodiments, the power source can be a low voltage three-phase power source. The power source can be configured to provide power to the overhead side 200, the underground side 300, and/or other powered electrical components on the mobile training lab 100. In some embodiments, the power for the mobile training lab 100 may be provided from an external source, such as the tow vehicle or a separate generator. In some embodiments, the power source can be positioned in the storage area 125 above the gooseneck in FIG. 1, although other locations for the power supply are also possible.

FIGS. 3-5 illustrate the mobile training lab 100 of FIGS. 1 and 2 in an example deployed or training configuration for providing overhead and underground EPZ grounding training. As shown, various components of the overhead side 200 and the underground side 300 are accessible in the deployed configuration to provide overhead and/or underground EPZ grounding training.

FIG. 3 illustrates a left side (an overhead side 200) of the mobile training lab 100 configured for providing overhead EPZ grounding training. In the illustrated embodiment, four power pole assemblies 202 are deployed from the left side of the mobile training lab 100 through access locations 123 in the left wall 117. Extension of the four power pole assemblies 202 can also be viewed in the top view of FIG. 4, which illustrates the mobile training lab 100 with the roof removed so that the interior of the training lab 100 is more easily visible.

In the illustrated embodiment, the power pole assemblies extend from the trailer and are configured to retract into the trailer for storage or travel. In embodiments where the training lab 100 is not configured to be mobile or trailer base, the power pole assemblies 202 may be configured as stand-alone pole assemblies that can be mounted on individual stands or as ground-mounted pole assemblies. Where the training lab 100 is not mobile, it may be not be necessary for the power pole assemblies 202 to retract as described below.

As shown in FIGS. 3 and 4, for training, the four power pole assemblies 202 extend out from the overhead side 200 of the mobile training lab. For storage and transport, the power pole assemblies 202 can be retracted, moved, or otherwise positioned so as to fit within the hollow interior of the mobile training lab 100 (e.g., as shown in FIGS. 1 and 2). In the deployed or training configuration, the power pole assemblies 202 simulate overhead power poles to provide practical and hands-on training related to the same. Although the illustrated embodiment includes four power pole assemblies 202, other numbers can be used in other embodiments. For example, the overhead side 200 of the mobile training lab 100 can include one, two, three, four, five, six, or more power pole assemblies 202. Further, in the illustrated embodiment, each power pole assembly 202 extends outwardly through a corresponding access location 123. In some embodiments, a plurality of the power pole assemblies 202 may extend through a single access location 123.

An embodiment of the overhead side 200 will be described below in greater detail with reference to FIGS. 6-17, so discussion of the overhead side 200 is brief in this overview section.

FIG. 5 is a right-side view (an underground side 300) of the mobile training lab configured for providing underground EPZ grounding training. In the illustrated embodiment, the right side of the mobile training lab 100 has been opened to provide access to various electrical equipment mounted within the mobile training lab 100 as part of the underground side 300. As shown in FIG. 5 (and also visible into the top view of FIG. 4, which illustrates the mobile training lab 100 with the roof removed), the underground side 300 comprises one or more cabinets 302 of electrical components common in underground wiring applications. In the illustrated embodiment, eight cabinets 302 of components are provided, although other numbers of cabinets 302 can be used in other embodiments (e.g., one, two, three, four, five, six, seven, eight, nine, ten, or more cabinets 302).

The cabinets 302 can house different types of equipment used in underground wiring applications. For example, in some embodiments, the cabinets 302 house one or more of the following types of components, single-phase transformers, three-phase transformers, three-phase load-break junction boxes, three-phase splice cabinets, and/or live front switches, among others. The cabinets 302 can be mounted on a frame positioned within the mobile training lab 100. The cabinets 302 can be individually isolated or insulated from each other (for example, as described below with reference to FIG. 18). This can, for example, prevent electrical shorting between components.

As shown in FIGS. 4 and 5, the cabinets 302 of components are accessible through an access location 123 in the right wall 115 of the mobile training lab 100. In the illustrated embodiment, the cabinets 302 of components are accessible through a single, large access location 123, although his need not be the case in all embodiments. The cabinets 302 of components 302 may also be positioned on or in front of an interior wall 304 that is positioned behind the cabinets 302. The interior wall 304 may separate the underground side 300 of the mobile training lab 100 from the remainder of the hollow interior. In some embodiments, the cabinets 302 may be mounted on, attached to, supported by, or extend through the interior wall 304. Other components may also be mounted on or supported by the interior wall 304. For example, as shown in FIG. 5, one or more risers 306 may be mounted on the interior wall 304. The risers 306 may be configured with power that can be routed to the component cabinets 302 during training.

As shown in FIG. 5, in some embodiments, one riser 306 is mounted on each end of the underground side 300 for a total of two risers 306. In other embodiments, other numbers of rises 306 can be used (for example, one, two, three, four or more). When the risers 306 are positioned on the interior wall 304, they may be enclosed within the mobile training lab 100 in the storage or transport configuration by, for example, closing the doors of the access locations 123 of the underground side. In other embodiments, the rises 306 may be mounted on one or more of the exterior walls of the trailer. These can be permanently mounted on the exterior walls of the trailer or stored within the trailer and then attached to the exterior walls of the trailer during use. For example, the top view of FIG. 4 illustrates an example where risers 306 or mounted on the left exterior wall 115 of the mobile training lab 100. In these embodiments, the risers 306 can be removed and stowed within the hollow interior of the mobile training lab 100 during transport or can be configured to remain positioned on the exterior walls of the mobile training lab 100 during transport.

An embodiment of the underground side 300 will be described below in greater detail with reference to FIGS. 18-20, so discussion of the underground side 300 is brief in this overview section.

The mobile training lab 100 can be configured to provide EPZ grounding training for overhead and underground applications using the overhead side 200 and the underground side 300, respectively. As shown in FIGS. 3 and 4, the overhead side 200 can include power pole assemblies that extend therefrom so as to provide a realistic and hands-on training setting. During training, the overhead side 200 can allow for simulation of overhead grounding. For example, a trainer or instructor may set up a scenario involving overhead power lines or related equipment, and the trainee can set up (what they believe to be) an EPZ by establishing grounding. The set up can then be evaluated so that they trainee can understand whether the EPZ they set up is accurate or sufficient to maintain their safety for that condition. A number of different conditions can be provided along with appropriate instruction, evaluation, and simulation.

Similarly, the underground side 300 can be configured to provide simulation of underground grounding. For example, a trainer or instruction may set up a scenario involving underground power lines or related equipment, and the trainee can set up (what they believe to be) an EPZ by establishing grounding. The set up can then be evaluated so that they trainee can understand whether the EPZ they set up is accurate or sufficient to maintain their safety for that condition. A number of different conditions can be provided along with appropriate instruction, evaluation, and simulation. The underground side 300 can also be configured to allow for training and evaluation regarding various switching scenarios. For example, a trainer can provide a switching scenario to be executed by the trainee. The trainee can physically perform the switching using the underground side 300 of the mobile training lab, and the switching can be evaluated by the trainer. Again, appropriate instruction, evaluation, and simulation can be provided.

To provide these trainings and simulations, the overhead side 200 and the underground side 300 can be powered by a power supply. The power supply can be, for example, a three-phase power source. In some embodiments, the power supply can be a low voltage power source such that the training and simulations can be performed safely, without risk of significant injury. In some embodiments, the overhead side 200 and the underground side 300 can be configured to appear as if wired with high voltage, while really being wired with low voltage. Having the appearance of high voltage allows the training to simulate real world conditions without actually providing enough voltage to cause significant injury. In some embodiments, the power supply that power the overhead side 200 and the underground side 300 can have both test and standard (energized) settings. The overhead side 200 and the underground side 300 can be controlled using one or more control panels provided on the mobile training lab 100.

Figure 21:
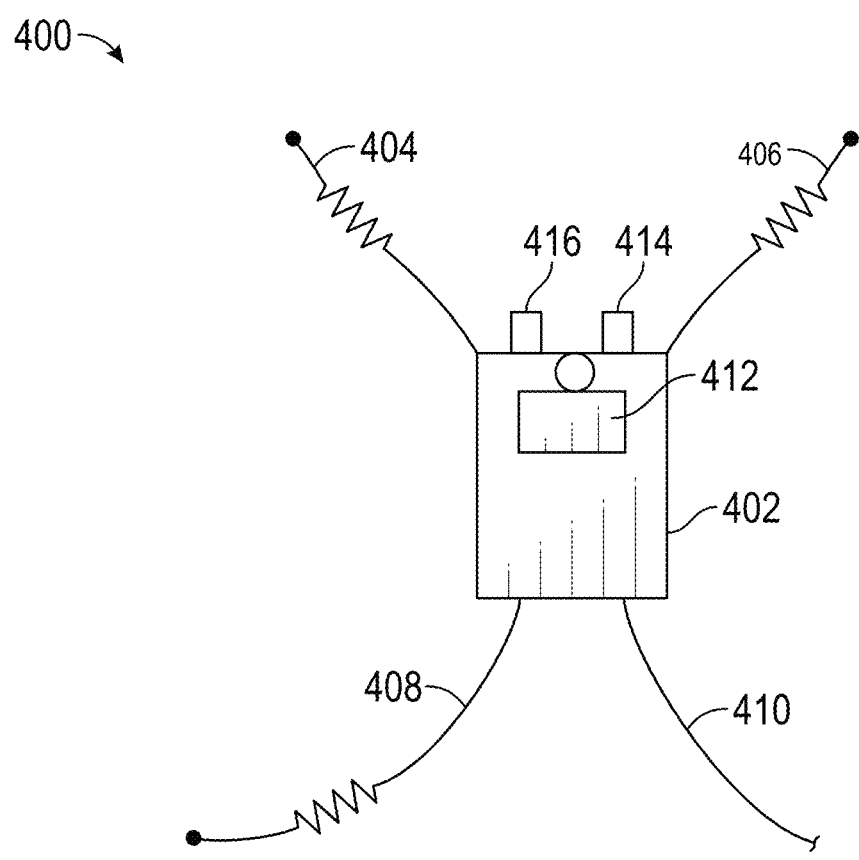
FIG. 21 illustrates an embodiment of a lineman meter configured for use with the mobile training lab during overhead and underground EPZ grounding training.

In some embodiments, the mobile training lab 100 can be used with a lineman meter. An example lineman meter is shown in FIG. 21, described below. The lineman meter may be configured to have connections simulating the arms and/or legs of a lineman, as well as appropriate resistances approximating the human body. During training on either the overhead or underground sides 200, 300 of the mobile training lab, the lineman meter can be positioned in place of the trainee. The simulation can then be run, and the lineman meter can indicate whether or not the grounding provided was sufficient to protect the trainee. The lineman meter will be described in more detail below with reference to FIG. 21.

Overhead Training Side

FIGS. 6-17 provide additional detail for embodiments of components of the overhead side 200 of a mobile training lab 100. The illustrated embodiments are provided by way of example and should not be construed as limiting as other variations, which are within the scope of this disclosure, are possible as will be apparent to those of ordinary skill in the art upon consideration of this disclosure. In some embodiments, the overhead side 200 may be provided as a stationary, non-mobile, or non-trailer mounted training lab. In such embodiments, the overhead training side 200 may not need to be configured so as to retract and deploy as described herein.

Figure 6:
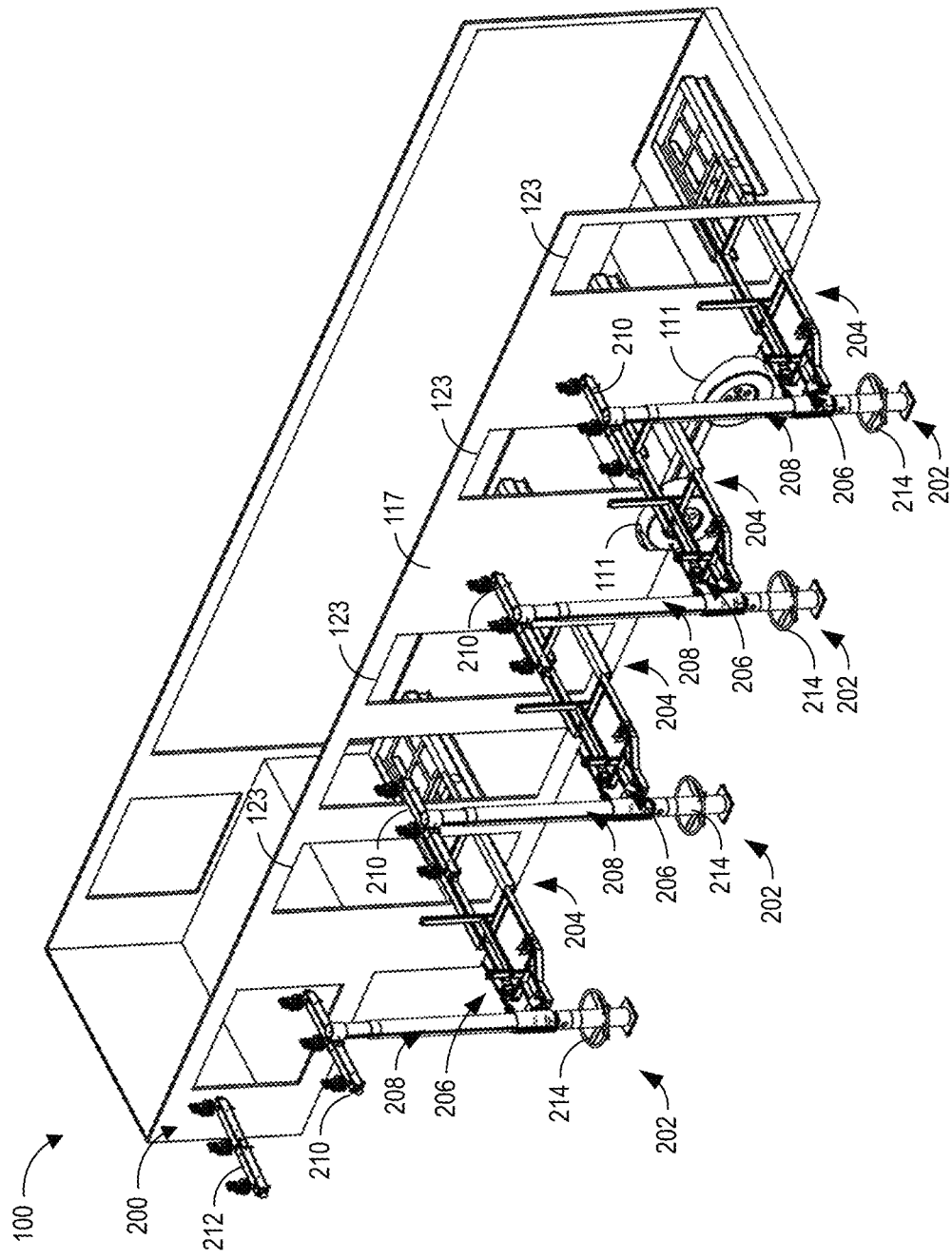
FIG. 6 is a perspective view of an embodiment of the overhead training side of the mobile training lab in a deployed configuration. For clarity, various portions of the mobile training lab, including the roof, back, doors, and underground training side have been omitted. In the illustrated embodiment, four power pole assemblies extend outwardly from doors in the side of the mobile training lab.

FIG. 6 is a perspective view of an embodiment of the overhead training side 200 of the mobile training lab in the deployed or training configuration. For clarity, various portions of the mobile training lab 100, including the roof, back, doors, and underground training side 300 have been omitted.

As shown in the illustrated embodiment, four power pole assemblies 202 extend outwardly from access locations 123 in the side of the mobile training lab 100. As noted previously, the power pole assemblies 202 can be retracted or moved back into the mobile training lab 100 for storage and transport. In the deployed or training configuration, the power pole assemblies 202 provide a realistic (e.g., full size, substantially full size, or nearly full size) power or utility pole on which grounding scenarios can be practiced and evaluated as part of an overhead EPZ grounding training.

In the illustrated embodiment, each power pole assembly 202 comprises a slide extension assembly 204, a pivot assembly 206, an extendible pole assembly 208, and a cross-arm 210. A more detailed view of a single power pole assembly 202 is provided in FIG. 7, which is described in more detail below.

As shown in FIG. 6, however, in the illustrated embodiment, the slide extension assembly 204 is configured to allow the power pole assembly 202 to slide into (e.g., for storage or transport) or out of (e.g., for training) the mobile training lab 100. As shown, the slide extension assembly 204 can be mounted within the hollow interior of the mobile training lab 100. As shown, one end of the slide extension assembly 204, such as a base, is mounted to the floor or frame of the interior of the mobile training lab 100. The slide extension assembly 204 can also include a sliding portion that slides relative to the base and out through the access location 123 to a position outside of the mobile training lab.

Figure 14:
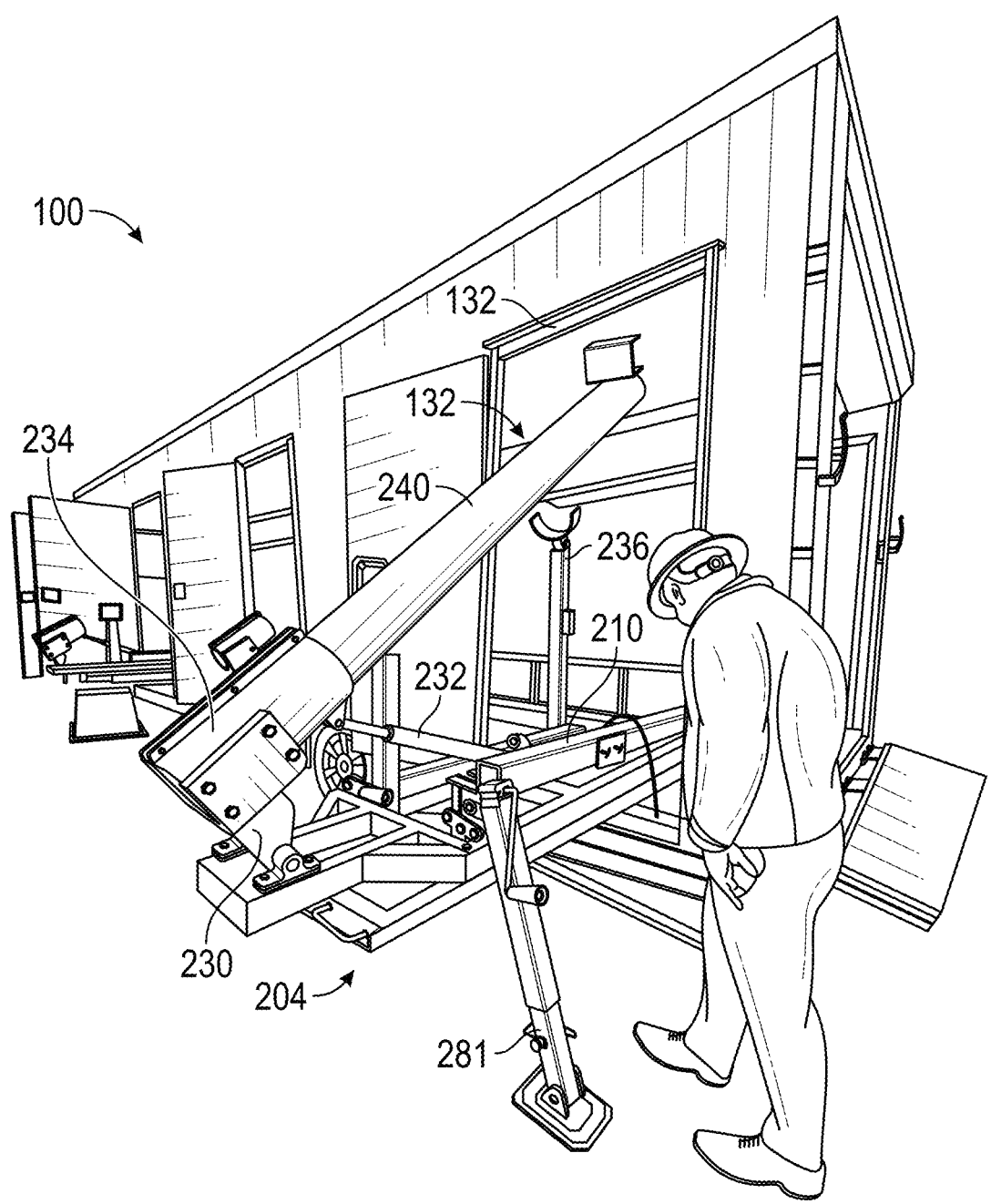
FIG. 14 illustrates an embodiment of the power pole assembly in a partially stowed configuration in which the pivot assembly has been used to pivot the extendible pole assembly for storage or transport.

An extendible pole assembly 208 is mounted to an opposite end of the slide extension assembly 204. In the illustrated embodiment, the extendible pole assembly 208 is mounted to the slide extension assembly 204 with a pivot assembly 206. In the illustrated embodiment, the pivot assembly 206 is configured to allow the extendible pole assembly 208 to pivot, tilt, or rotate relative to the extension assembly. As shown in FIGS. 3 and 5, for example, the extendible pole assembly 208 can be taller than the mobile training lab 100 when in the deployed, vertical position. The pivot assembly 206 can allow the extendible pole assembly 208 to be pivoted to a lowered position to fit within the mobile training lab 100 in the stowed or transport configuration. FIG. 14, for example, shows the extendible pole assembly 208 pivoted using the pivot assembly 206 so as to fit through the access location 123 and into the mobile training lab 100.

In some embodiments, including the illustrated embodiment, the power pole assembly 202 can include an extendible pole assembly 208 that allows the overall length or height of the pole to be increased, for example, from 9 feet to 15 feet. This can further facilitate realistic, real world, or full-size trainings or simulations as the height of the pole can be extended above the height of the mobile training lab 100. For example, this can help to place a trainee in a physical position that matches a realistic physical position that would be experienced when working on a power or utility pole. An example embodiment of the extendible pole assembly 206 will be described in more detail below with reference to FIGS. 8-11. As shown in FIG. 6, however, in some embodiments, the power pole assembly 202 can include a foot portion 214. The foot portion 214 can be configured to provide trainees a place to stand that is off of the ground while training. In some instances, training may require that trainees train in an off-ground condition. In such instances, the foot portion 214 can advantageously satisfy this requirement. In other embodiments or instances, however, trainees can train while standing on the ground.

Figure 7:
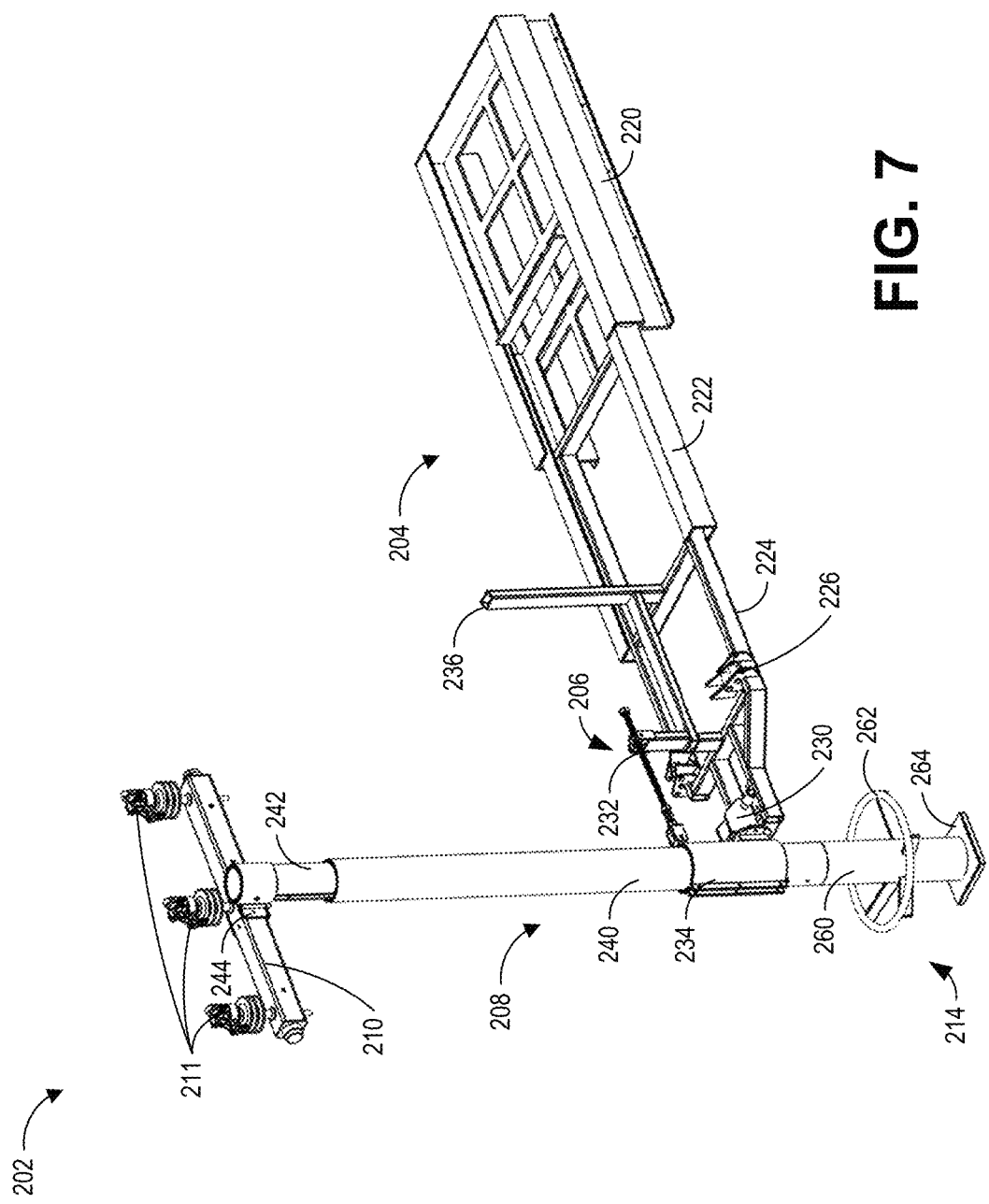
FIG. 7 illustrates a perspective view of an embodiment of one of the power pole assemblies of the overhead training side of the mobile training lab of FIG. 6. The power pole assembly includes an extension slide assembly, a pivot assembly, and an extendible pole assembly.

As shown in FIG. 6, a cross-arm 210 can be provided at the top of each extendible pole assembly 208. In some embodiments, the cross-arm 210 can be removably attachable to the top of each pole assembly 208, for example, using a bracket as shown in FIG. 7, such that it can be removed for storage in the stowed or transport configuration. In some embodiments, the cross-arm 210 can be stored on the slide extension assembly 204 (as shown, for example, in FIG. 15, when not attached to the extendible pole assembly 208.

In the illustrated embodiment, an auxiliary cross-arm 212 is also provided. The auxiliary cross-arm 212 can be an initial location from which power lines can be run to the cross-arms 210 on each of the power pole assemblies 202. An example auxiliary cross-arm assembly is shown in FIG. 17, which is described below.

FIG. 6 also illustrates that in some embodiments, a split axle configuration for the mobile training lab 100 may accommodate placement of the power pole assemblies 202. As shown, spreading apart the axles can provide a space between the wheels 111 that accommodates one of the power pole assemblies 202. This may allow for even spacing and heights of the power pole assemblies 202.

FIG. 7 illustrates a perspective view of an embodiment of one of the power pole assemblies 202 of the overhead training side 200 of the mobile training lab 100. In the illustrated embodiment, the power pole assembly 202 includes an extension slide assembly 204, a pivot assembly 206, and an extendible pole assembly 208 as mentioned above. FIG. 7 provides additional detail for the power pole assemblies 202 according to the illustrated embodiment.

As shown in FIG. 7, the slide extension assembly 204 can comprise a base 220, one or more intermediate sliding sections 222, and distal sliding section 224. As noted previously, the base 220 can be configured to mount to the interior of the mobile training lab 100, for example to a frame within the mobile training lab 100 or to the interior floor thereof. One or more intermediate sliding sections 222 can be arranged to slide or translate relative to the base 220. For example, the base 220 can include channels, and the one or more intermediate sliding sections 222 can include wheels configured to ride within the channels to allow the intermediate sliding sections 222 to translate away from the base. If more than one intermediate sliding section 222 is included, a similar structure may be provided to allow translations between adjacent sliding sections 222. Finally, a similar structure may be provided between the last intermediate sliding section 222 and the distal sliding section 224. Other mechanisms and arrangements are also possible.

As shown in FIG. 7, the distal sliding section 224 (and/or one or more of the intermediate sliding sections 222) can include mounting points 226 for additional feet that can be configured to support the extension slide assembly 204 in the extending configuration. FIG. 14, for example, shows a foot 281 that can be mounted to the mounting points 226.

The distal sliding section 224 can include a structure to which the pivot assembly 206 can attach. As noted previously, the pivot assembly 206 can be configured to allow the extendible pole assembly 208 to pivot or tilt from a vertical position (e.g., the deployed position) to an inclined or even horizontal position for storage. In some embodiments, an inclined position may be preferred as it can optimize storage of a long pole along the diagonal measurement of the interior of the mobile training lab. In some embodiment, the inclined position can be, for example, about 30 degrees, about 35 degrees, about 40 degrees, about 45 degrees, about 50 degrees, about 55 degrees, about 60 degrees, about 65 degrees, or about 70 degrees measured with respect to vertical, although other positions are also possible.

As shown in FIG. 7, the pivot assembly 206 can comprise a hinge 230, an actuator 232, a coupling 234, and pole support 236. The hinge 230 can be used to pivotally attach the extendible pole assembly 208 to the distal sliding section 224. The hinge 230 is further configured to allow pivoting or tilting of the extendible pole assembly 208 to the distal sliding section 224.

The actuator 232 can be configured to cause the tilting of the extendible pole assembly 208. In the illustrated embodiment, the actuator 232 comprises a lead screw fixed on one end to the extendible pole assembly 208 and passing through a carriage that is fixed with respect to the distal sliding section 224. In this configuration, as the lead screw is rotated, the distance portion of the lead screw between the extendible pole assembly 208 and passing through a carriage shortens or lengthens depending on the direction of rotation of the lead screw, causing tilting of the extendible pole assembly 208. In some embodiments, a motor may be provided to drive rotation of the lead screw. In other embodiments, the lead screw can be manually rotated. In other embodiments, other types of actuators 232 can be used including electrically or hydraulically powered linear actuators.

As shown in FIG. 7, a pole support 236 can be provided to support the extendible pole assembly 208 in the inclined position. In the illustrated embodiment, the pole support 236 extends upwardly from the extension slide assembly 204, for example, from a portion of the distal sliding section 224. When the pole is inclined into its storage or transport position, it can be supported by the pole support 236.

The hinge 230 is attached to a coupling 234. The coupling 234 is used to attach the extendible pole assembly 208 to the hinge 230. In the illustrated embodiment, the coupling 234 comprises a split coupling, configured to clamp around the extendible pole assembly 208. Other types of coupling 234 can also be used. As will be described in more detail below, the coupling 234 can also be insulated so as to electrically isolate the extendible pole assembly 208 from the remainder of the structure and mobile training lab 100. For example, in some embodiments an insulative or dielectric material is used to line the interior of the coupling at all points that contact the extendible pole assembly 208, As mentioned previously, in some embodiments, the pole comprises extendible pole assembly 208 configured to extend so as to increase the height or length of the pole. This can be preferred as it can create more realistic overhead training situations and be used to accommodate trainees of different heights. This, however, need not be the case in all embodiments. A static length pole assembly 208 can be used in some embodiments.

The illustrated embodiment, however, includes an extendible pole assembly 208. As shown in FIG. 7, the extendible pole assembly 208 comprises an outer pole 240 and an inner pole 242. The inner pole 242 is configured to telescope relative to the outer pole 240 using an extension mechanism 270 that will be described below with reference to FIGS. 9-11. At the top of the inner pole 242, a cross-arm bracket 244 can be provided for supporting the cross-arm 210. As noted previously, the cross-arm 210 can be removable in some embodiments. In the illustrated embodiment, the cross-arm 210 is provided with three insulators 211 for receiving three power lines in the deployed or training configuration.

At the bottom of the extendible pole assembly 208, the foot portion 214 is provided. In the illustrated embodiment, the foot portion 214 includes a pole section 260, a support ring 262, and foot 264. The foot portion 214 is configured to support the extendible pole assembly 208 in the deployed configuration (e.g., in a vertical configuration) and is configured to rest on the ground. The pole section 260 extends between the bottom of the outer pole 240 and the ground. The pole section 260 can terminate in a foot 264. A support ring 262 may be provided to allow a place for trainees to stand while working that is off of the ground. As mentioned above, in some testing scenarios, it may be required that the trainees are positioned above the ground, and the support ring 262 may accommodate this requirement. The foot portion 214 may also be insulated, further insulating and isolating the extendible pole assembly 208 from ground.

Figure 8:
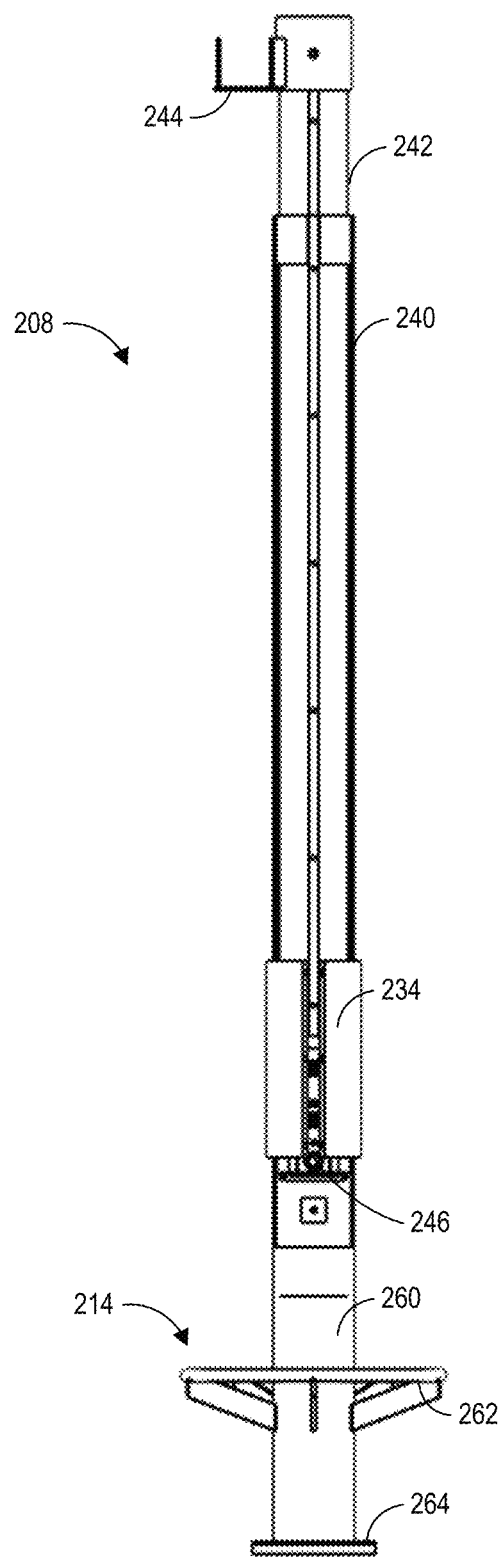
FIG. 8 illustrates a side view of an embodiment of the extendible pole assembly of the power pole assembly of FIG. 7.
Figure 9:
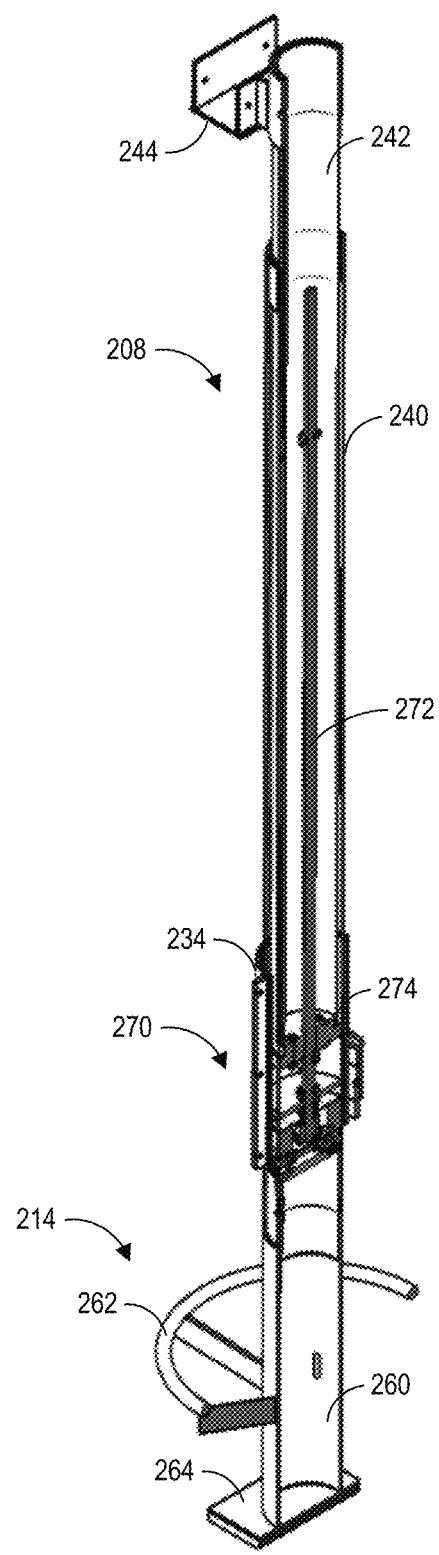
FIG. 9 is a perspective, cross-sectional view of the extendible pole assembly of FIG. 7, illustrating an embodiment of an extension mechanism thereof.

FIG. 8 illustrates a side view of an embodiment of the extendible pole assembly 208 of the power pole assembly 202 of FIG. 7 and FIG. 9 is a perspective cross-sectional view thereof. As mentioned before, the extendible pole assembly 208 in this embodiment comprises the outer pole 240 with the inner pole 242 telescoping nested therein. The bottom most portion of the outer pole 240 is connected to the foot portion 214, which comprises the pole section 260, the support ring 262, and the foot 264. FIGS. 8 and 9 also illustrate the coupling 234 that attaches the extendible pole assembly 208 the pivot 230 (although the pivot 230 is not illustrated).

Figure 11:
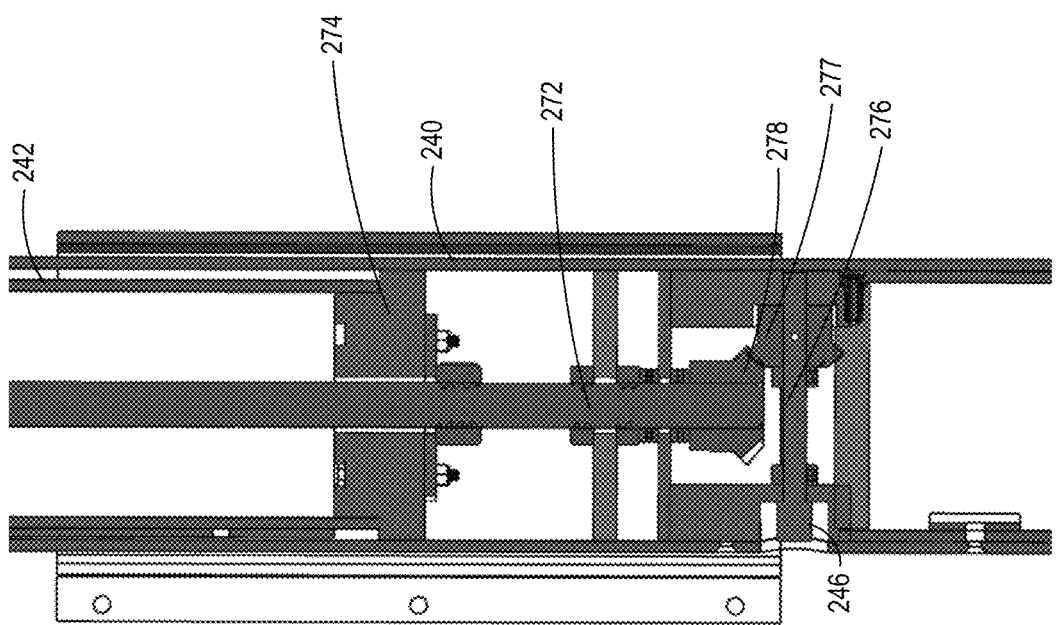
FIG. 11 is a cross-sectional detail view of the extension mechanism of the extendible pole assembly of FIGS. 8 and 9.
Figure 10:
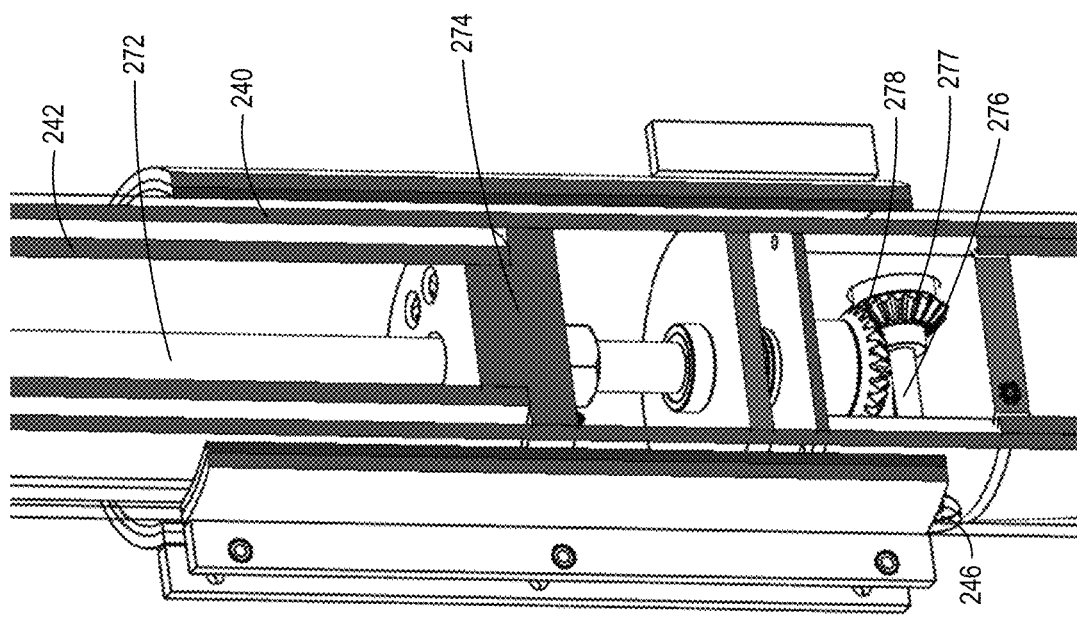
FIG. 10 is a cross-sectional detail view of the extension mechanism of the extendible pole assembly of FIGS. 8 and 9.

FIG. 8 further illustrates an actuator input 246. The actuator input 246 can be configured to be actuated to drive extension or retraction of the inner pole 242 relative to the outer pole 240. An extension mechanism 270, which is shown in FIG. 9, but better seen in the detailed views of FIGS. 10 and 11 is connected to the actuator input 246 and driven by the actuator input 246. As shown in FIG. 8, the actuator input 246 can comprise a rotatable bolt. The actuator input 246 can then be manually actuated by rotating the bolt, for example, using a ratchet or other manual tool. Or the actuator input 246 can be actuated using a powered tool, such as a drill, for example.

As shown in FIG. 9, a lead screw can extend upwardly from the extension mechanism 270 and through the inner pole 242. A carriage 274 is attached to the inner pole 242 and mounted on the lead screw 272. As the lead screw 272 is rotated (for example, by actuating the actuator input 246) the carriage 274 travels up and down along the lead screw 272 taking the inner pole 242 along with it.

FIGS. 10 and 11 are perspective cross-sectional and cross-sectional detail views, respectively, of a portion extendible pole assembly 202, illustrating an embodiment of an extension mechanism 270 thereof. As shown in these figures, the actuator input 246 is mounted to an input shaft 276. Rotation of the actuator input 246 causes a corresponding rotation of the input shaft 276. A first bevel gear 277 is mounted to the input shaft 276 and rotates with the input shaft 276. The first bevel gear 277 is meshingly engaged with a second bevel gear 278. The second bevel gear 278 is attached to the lead screw 272. In this way, rotation of the actuator input 246 is configured to cause corresponding rotation of the lead screw 272. The rotational motion is transferred through the input shaft 276, the first bevel gear 277, and the second bevel gear 278 to the lead screw 272. As the lead screw 272 rotates, the carriage 274 moves up and down along the lead screw 272. Since the carriage 274 is fixed to the inner pole 242, the inner pole 242 also moves up and down, telescoping within the outer pole 240. As shown in FIGS. 10 and 11, the carriage 274 can be mounted to the bottom end of the inner pole 242. Other mechanisms for raising and lower the height of the pole can also be used.

Figure 12:
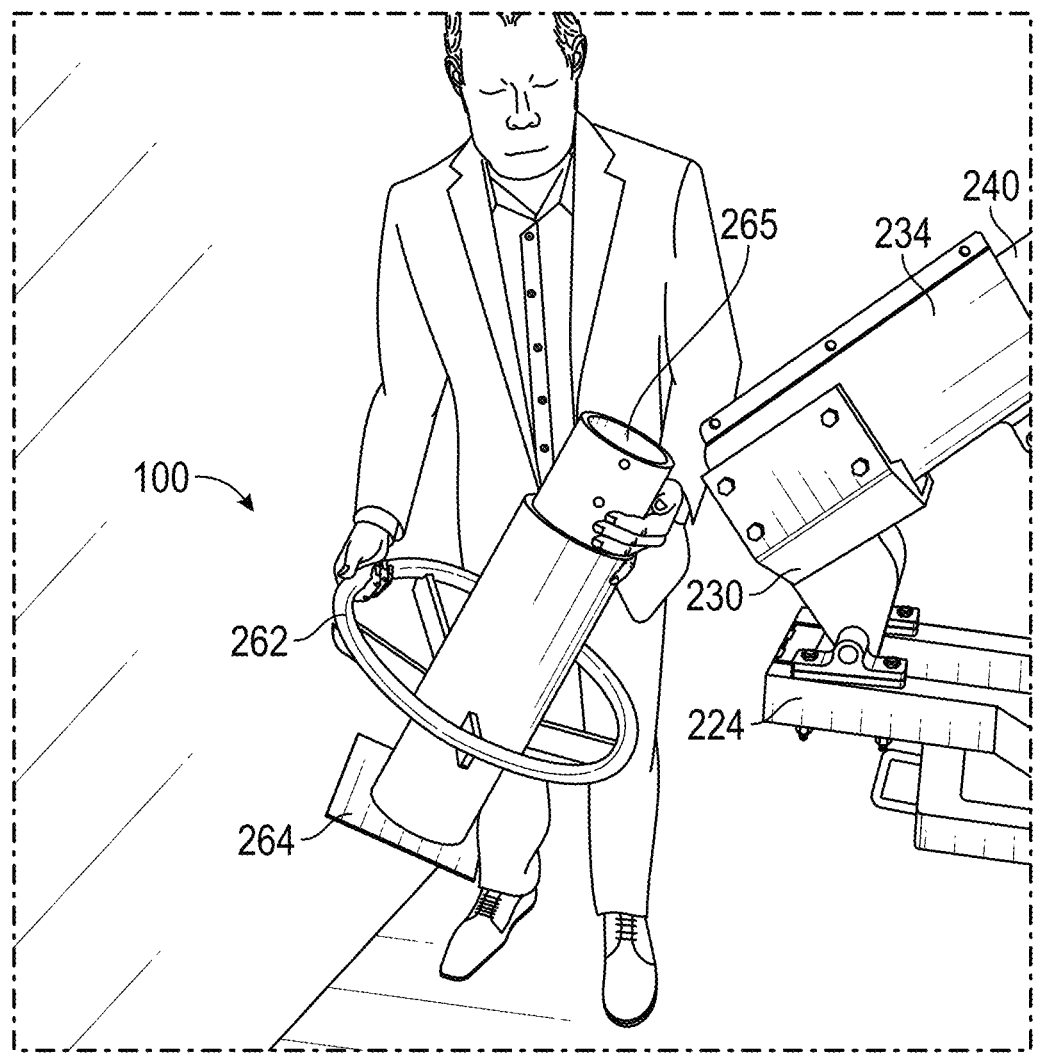
FIG. 12 illustrates an embodiment in which a foot portion of the extendible pole assembly is removable.
Figure 13:
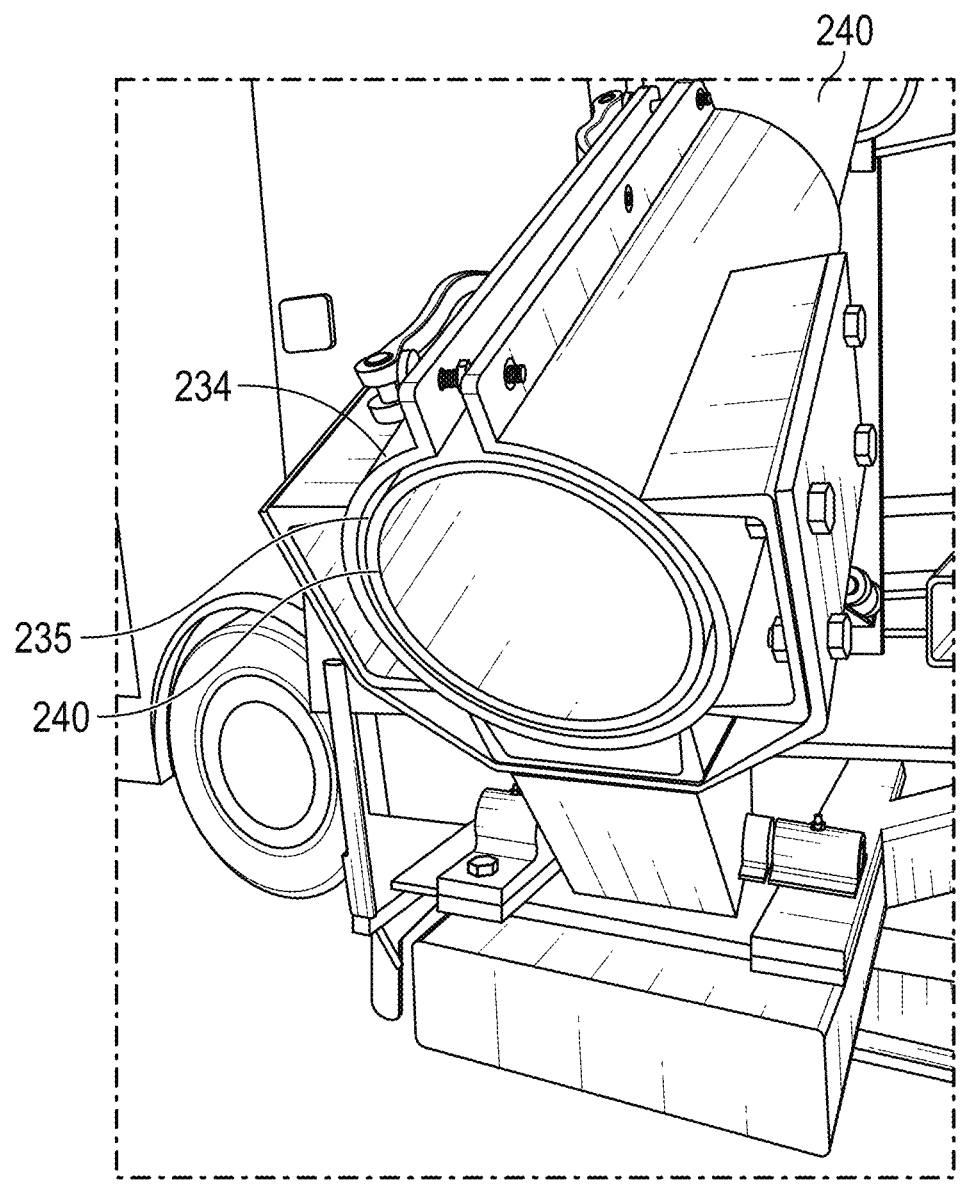
FIG. 13 illustrates a bottom portion of the extendible pole assembly with the foot portion removed, according to an embodiment.

In some embodiments, the foot portion 214 can be removable from the extendible pole assembly 208. This can facilitate storage of the extendible pole assembly 208 and the foot portion 214 within the mobile training lab 100. FIG. 12 illustrates an embodiment in which the foot portion 214 of the extendible pole assembly 208 is removable. As mentioned previously, the foot portion 214 can include the pole section 260, the support ring 262, and the foot 264. The pole section 260 can be configured to nest within the interior of the outer pole 240 (as shown in FIG. 13). FIG. 12 also illustrates that at least a portion of the interior of the foot section can be filed with an insulating or dielectric material 265 to provide further insulation and electrical isolation for the pole.

FIG. 13 illustrates a bottom portion of the extendible pole assembly 208 with the foot portion 214 removed. As shown, in some embodiments, the outer pole 240 can be hollow. The lower most hole end of the outer pole 240 can be configured receive the pole section 260 of the foot portion. FIG. 13 also illustrates an example of insulation that can be provided between the coupling 234 and the outer pole 240. In the illustrated example, the coupling 234 comprises a split ring coupling configured to clamp onto the outer pole 240. However, as shown, a layer of insulating or dielectric material 235 is provided between the coupling 234 and the outer pole 240 to insulate the extendible pole assembly 208 from the remainder of the mobile training lab 100.

Figure 15:
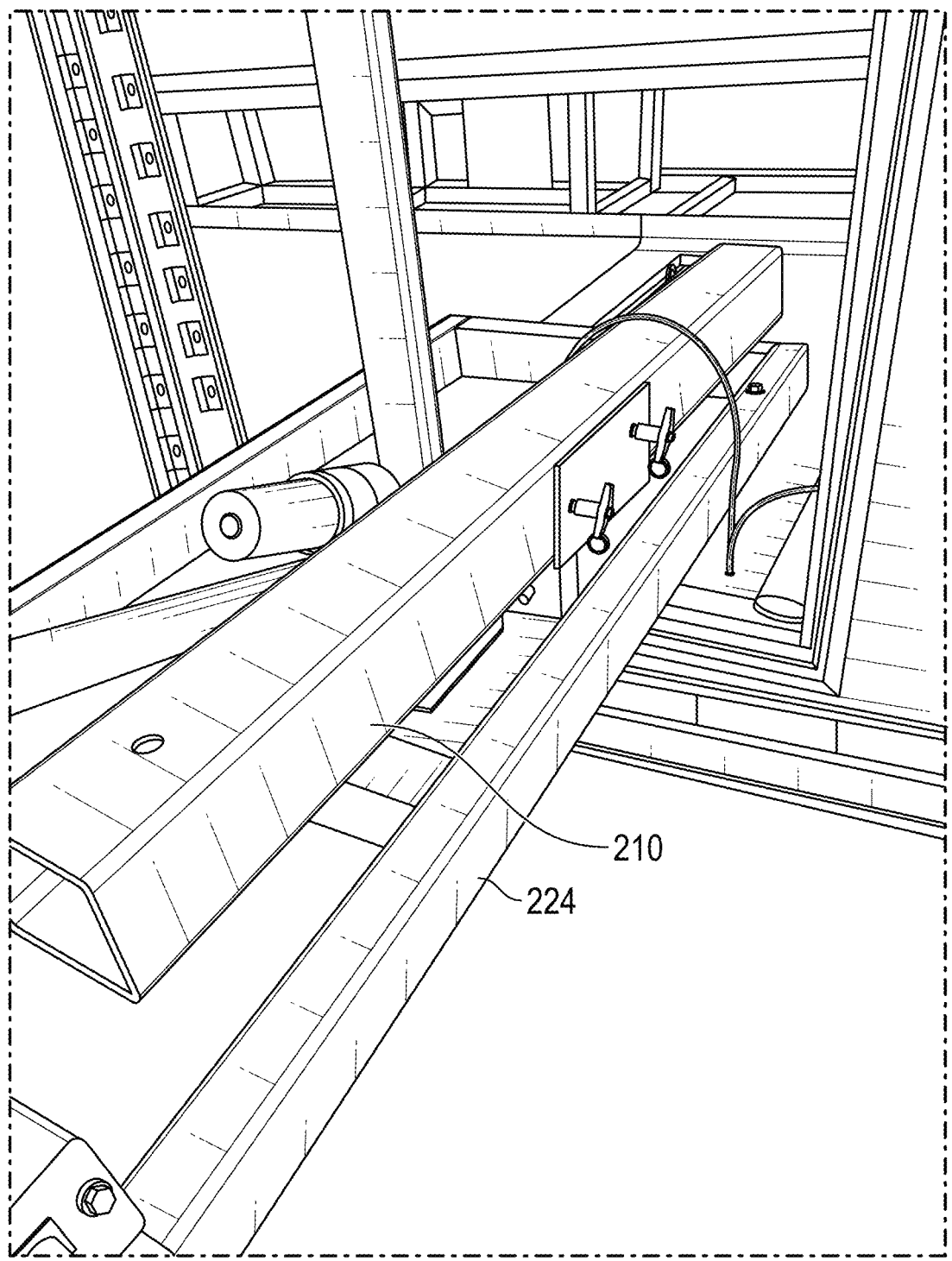
FIG. 15 illustrates an embodiment in which a cross-arm of the extendible pole assembly can be removed and stored on the extension slide assembly in a stowed or transport configuration.

FIG. 14 illustrates an embodiment of the power pole assembly 202 in a partially stowed configuration in which the pivot assembly 206 has been used to pivot the extendible pole assembly 208 for storage or transport. As shown, the pivot 230 has been used to recline the extendible pole assembly 208 such that the outer pole 240 can be supported by the pole support 236. In the illustrated configuration, the foot portion 214 has already been removed, but the foot 281 of the extension slide assembly 204 is still extended to support the cantilevered weight of the extension slide assembly 204. To complete stowage, the foot 281 can be pivoted upward and the extension slide assembly 204 can be used to slide the power pole assembly 202 into the interior of the mobile training lab 100. Note, in FIG. 14, how placing the extendible pole assembly 208 in an inclined position allows it to fit through the access location 132 and into the interior of the mobile training lab 100. FIG. 14 also shows the cross-arm 210 stowed on the extension slide assembly 204. FIG. 15 provides another view of the cross-arm 210 of stored on the distal sliding section 224 of the extension slide assembly 208 in a stowed or transport configuration.

Figure 16:
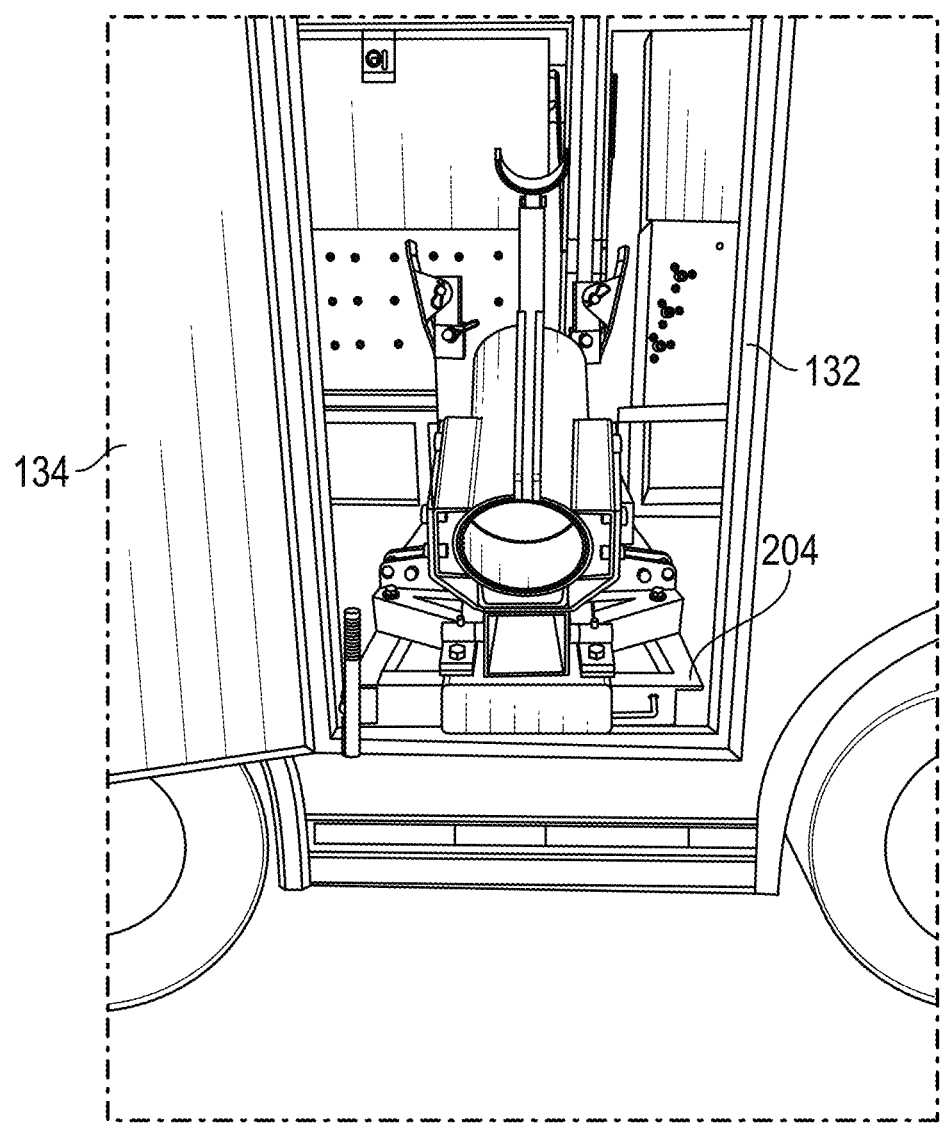
FIG. 16 illustrates an embodiment of the power pole assembly in a stowed configuration in which the pivot assembly has been used to pivot the extendible pole assembly and the extension slide assembly has been moved back inside the mobile transport lab for storage or transport.

FIG. 16 illustrates an embodiment of the power pole assembly 202 in a stowed configuration in extension slide assembly 204 has been moved back inside the mobile transport lab for storage or transport. The access location 132 can be closed with a door 134.

Figure 17A:
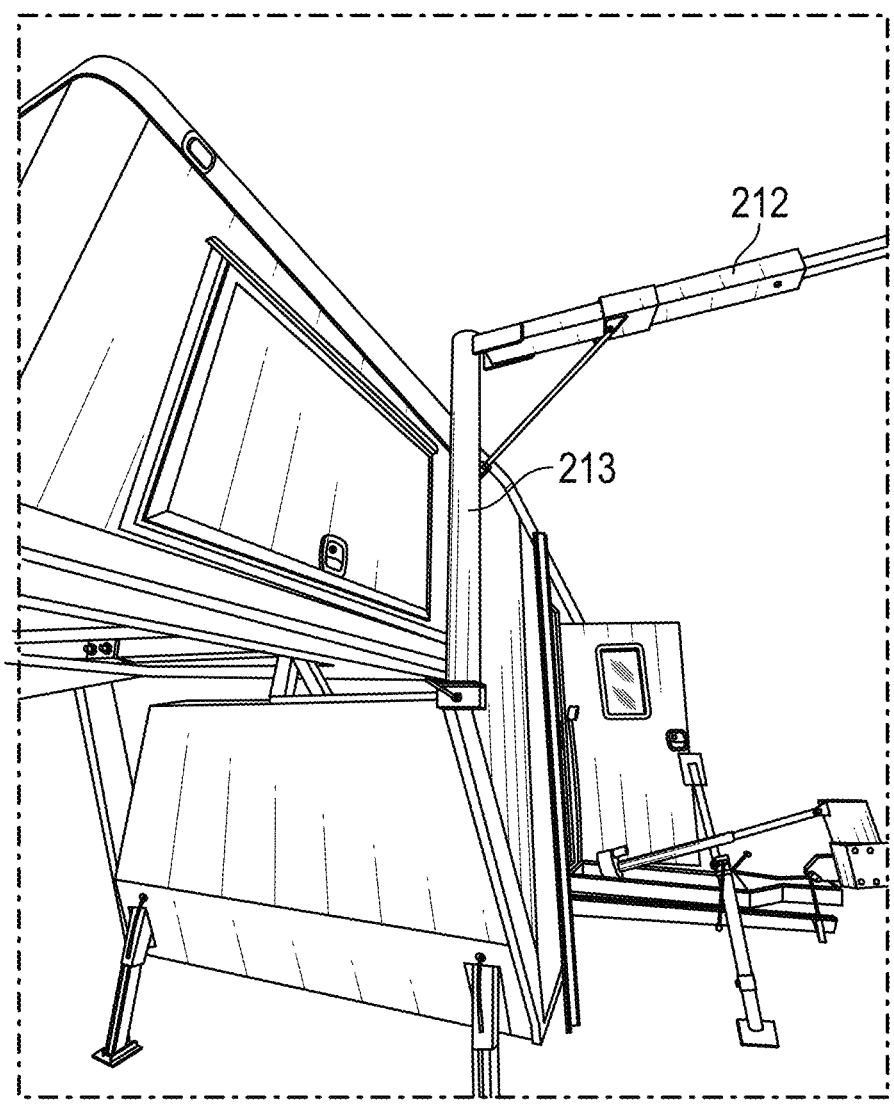
FIG. 17A is a perspective view illustrating a cross-arm assembly configured to extend from a side of the mobile training lab according to an embodiment.

FIG. 17A is a perspective view illustrating the auxiliary cross-arm 212 introduced in FIG. 6. FIG. 17A additionally illustrates a support structure 213 configured to support the auxiliary cross-arm 212. As mentioned previously, the auxiliary cross-arm 212 can be configured to provide a starting point from which to run power lines to the other power pole assemblies 202. FIG. 17A illustrates the auxiliary cross-arm 212 in a deployed configuration. In the stowed or transport configuration, the support structure 213 and auxiliary cross-arm 212 can be removed and stored in the mobile training lab 100.

Figure 17B:
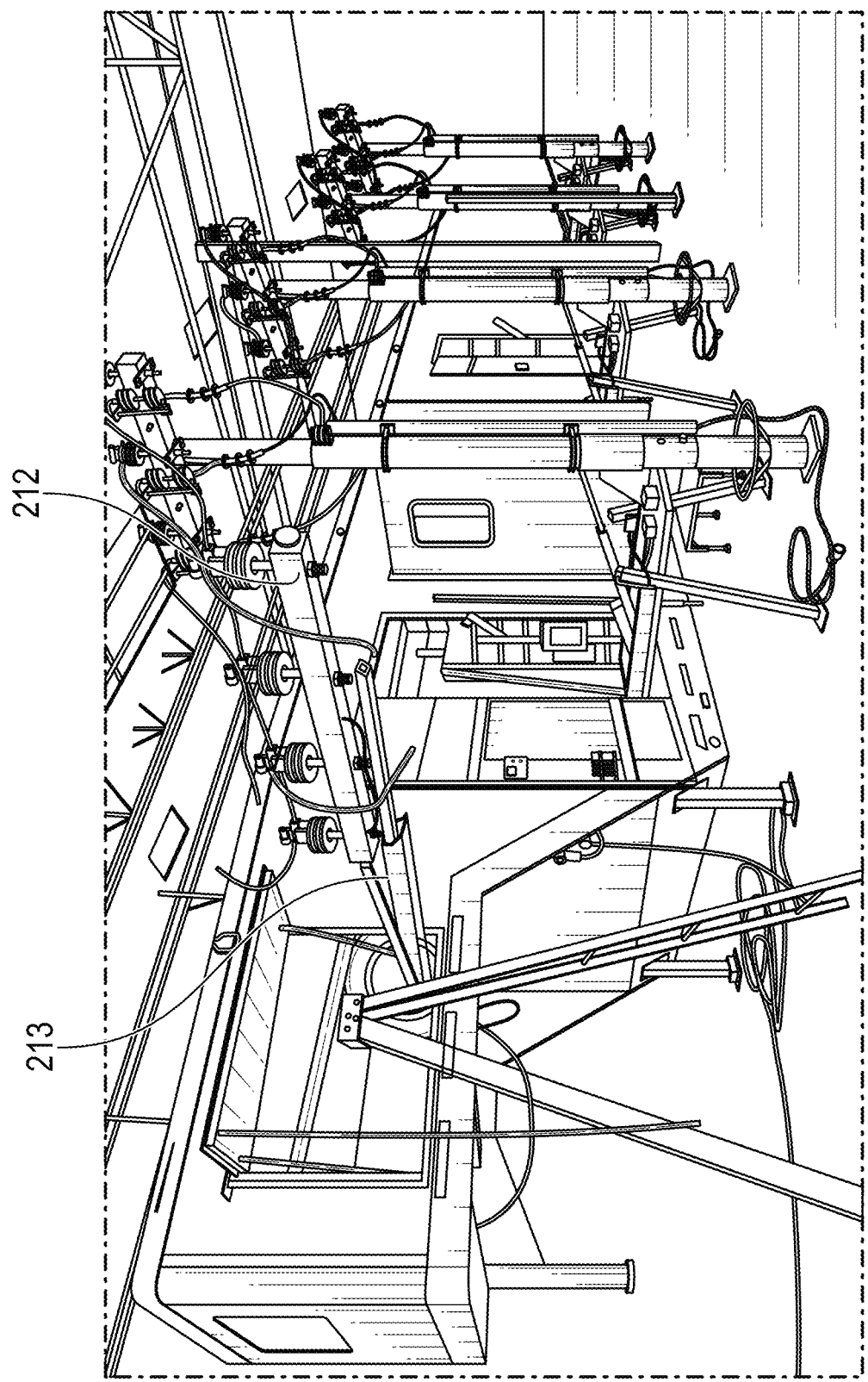
FIG. 17B is a perspective view illustrating another embodiment of a cross-arm assembly configured to extend from a side of the mobile training lab.

FIG. 17B is a perspective view illustrating an additional embodiment of the auxiliary cross-arm 212. In this example, the cross-arm 212 is connected to a support structure 213 that is attached inside a storage area in the gooseneck of the trailer. The support structure 213 can be extendible and retractable such that the cross-arm 212 can be moved within the trailer for storage and transport and extended from the trailer during use.

Underground Training Side

An example configuration of the underground training side 300 of the mobile training lab will be described with reference to FIGS. 5 and 18-20. As described previously, FIG. 5 is a right-side view (the underground side 300) of the mobile training lab 100 and is configured for providing underground EPZ grounding training. The underground side 300 comprises one or more cabinets 302 of electrical components common in underground wiring applications. In the illustrated embodiment, eight cabinets 302 of components are provided, although other numbers of cabinets 302 can be used in other embodiments (e.g., one, two, three, four, five, six, seven, eight, nine, ten, or more cabinets 302). In some embodiments, the underground training side 300 can be provided as a non-mobile, stationary, or non-trailer mounted training lab.

The cabinets 302 can house different types of equipment used in underground wiring applications. For example, in some embodiments, the cabinets 302 house one or more of the following types of components, single-phase transformers, three-phase transformers, three-phase load-break junction boxes, three-phase splice cabinets, and/or live front switches, among others. The cabinets 302 can be mounted on a frame positioned within the mobile training lab 100. The cabinets 302 can be individually isolated or insulated from each other. This can, for example, prevent electrical shorting between components.

Figure 18:
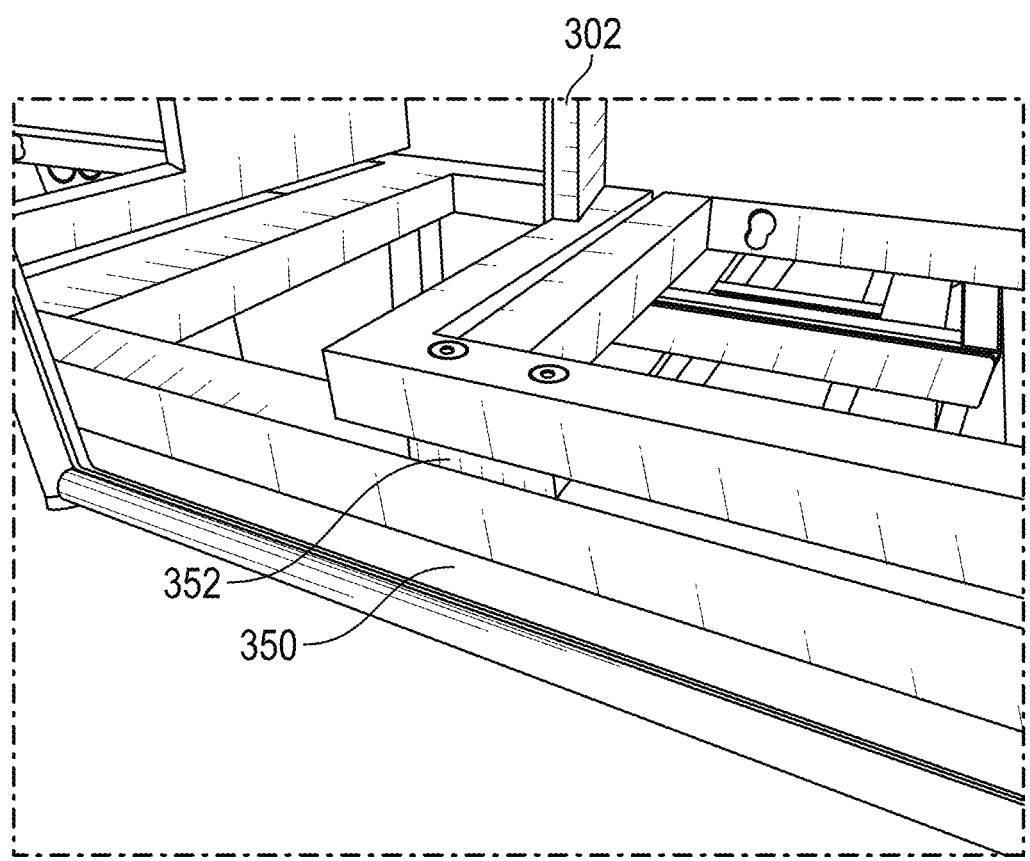
FIG. 18 is a detail view illustrating insulating material provided to insulate the various electrical equipment of the underground training side of the mobile lab according to an embodiment.

FIG. 18 is a detail view illustrating insulating material 352 provided to insulate the various electrical equipment of the underground training side 300 of the mobile lab 100. As shown, the mobile training lab 100 can include a frame 350 for supporting the cabinets 302. In the illustrated embodiment, the frame 350 comprises metal. To isolate and insulate each of the cabinets 302 from each other and from the remainder of the mobile training lab 100, blocks on insulating material 352 can be positioned between the frame 350 and the cabinet 302. Other methods and mechanisms for insulating and isolating the cabinets 302 from each other are also possible. In some embodiments the insulating material 352 comprises ultra-high-molecular-weight (UHMW) polyethylene, high density polyethylene (HDPE), or other similar materials.

Figure 19:
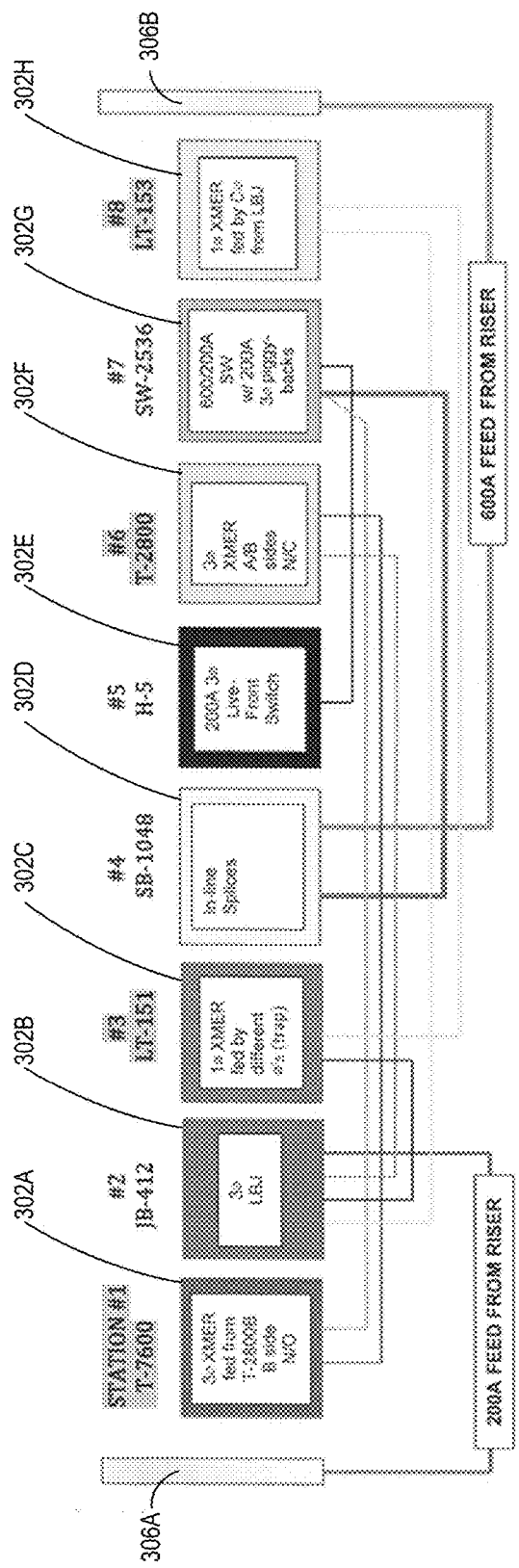
FIGS. 19 and 20 illustrate schematically the various electrical equipment provided on the underground training side of the mobile lab according to an embodiment.
Figure 20:
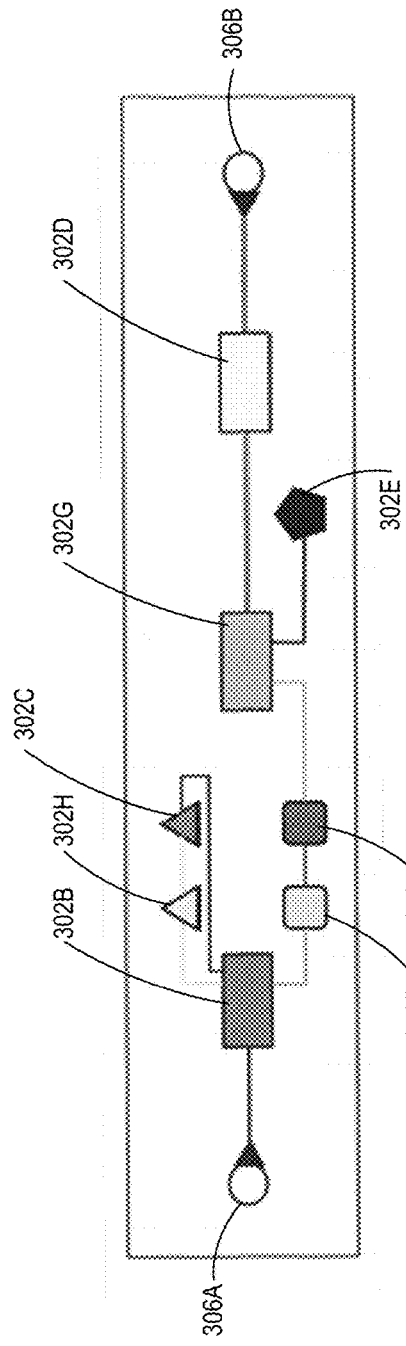

FIGS. 19 and 20 illustrate schematically the various electrical equipment provided on the underground training side 300 of the mobile lab 100 according to an embodiment. FIG. 19 illustrates the electrical components arranged in the positions illustrated in FIG. 5, with eight cabinets 302 of electrical components arranged from left to right along the underground side 300. Each of the cabinets 302 can comprise a type of electric or power component common in underground power applications. In FIG. 19, each of the cabinets/components are designated 302A-302H and electrical connections between the cabinets 302 are also illustrated. FIG. 20 illustrates the cabinets/components 302A/302H in a schematic wiring diagram which more clearly illustrates the electrical connections therebetween. The variety in cabinets/components can be selected to represent common underground systems and further selected to provide multiple switching scenarios that can keep customers energized without interruption to power or switching, which requires de-energizing customers dependent upon the schematic and proper testing of energized lines. Inclusion of a variety of cabinets/components provides the opportunities to create simple applications to very complicated trouble shooting applications. An example configuration of the cabinets/components will now be described.

As shown in FIGS. 19 and 20 (and also with reference to FIG. 5), the underground side 300 can comprise a first cabinet 302A. The first cabinet 302A can comprise a three-phase transformer. The underground side 300 can also comprise a second cabinet 302B. The second cabinet 302B can comprise a three-phase load break junction box. The underground side 300 can also comprise a third cabinet 302C. The third cabinet 302C can comprise a single-phase transformer. The single-phase transformer can be fed by a different phase of power. The underground side 300 can also comprise a fourth cabinet 302D. The fourth cabinet 302D can comprise a three-phase in-line splice box. The underground side 300 can also comprise a fifth cabinet 302E. The fifth cabinet 302E can comprise a live-front switch. In some embodiments, the live-front switch comprises a 200A live-front switch. The underground side 300 can also comprise a sixth cabinet 302F. The sixth cabinet 302F can comprise another three-phase transformer. The underground side 300 can also comprise a seventh cabinet 302G. The seventh cabinet 302G can comprise a three-phase switch. In some embodiments, the three-phase switch can comprise a 600A switch with 200A piggy backs. Finally, the underground side 300 can also comprise an eighth cabinet 302H. The eighth cabinet 302H can comprise another single-phase transformer.

FIGS. 19 and 20 (as well as FIG. 5) also illustrate that the cabinets/components 302A-302H can be positioned between first and second rises 306A, 306B. In the illustrated embodiment, the first riser 306A can be configured to provide a 200A feed, while the second riser 306B can be configured to provide a 600A feed. As shown, the 200A feed from the first riser 306A can be connected to the cabinet 302B that includes the three-phase load break junction box. The second riser 306B can provide the 600A feed to the cabinet 302D which includes the in-line splice box.

FIGS. 19 and 20 also illustrate additional detail about how the components 302A-302H and the risers 306A, 306B can be wired to each other. For example, the first riser 306A can be electrically connected to the three-phase load-break junction box cabinet 302B. The three-phase load-break junction box cabinet 302B can be wired to the first single phase transformer cabinet 302C. The first single-phase transformer cabinet 302C can be wired to the second single-phase transformer cabinet 302H, which can be wired back to the three-phase load-break junction box cabinet 302B. Additionally, the three-phase load-break junction box cabinet 302B can be wired to the first three-phase transformer 302F. The first three-phase transformer 302F can be wired to the second three-phase transformer 302A, which can be wired to the three-phase switch cabinet 302G. The three-phase switch cabinet 302G can be wired to the live front switch cabinet 302E. The three-phase switch cabinet 302G can also be wired to the in-line splice cabinet 302D, which can be wired to the second riser 306B.

The illustrated arrangement of components provided in FIGS. 5, 19, and 20 shows one example configuration for the underground training side 300. Other configurations, including other component cabinets in other wiring configurations, are also possible. The component cabinets and wiring configurations are selected and configured to provide training related to grounding and switching in underground power scenarios.

Lineman Meter

FIG. 21 illustrates an embodiment of a lineman meter 400 configured for use with the training lab 100 (for example, whether configured as a mobile or stationary training lab 100) during overhead and/or underground EPZ grounding training. The lineman meter 400 can be configured to approximate and simulate the body of the trainee or lineman so that the grounding or switching being performed can be tested and evaluated. In the illustrated embodiment, the lineman meter 400 comprises a housing 402, first and second arm leads 404, 406, one or more leg leads 408, a power/data cord 410, controls 412, and indicator lights 414, 416.

The first and second arm leads 404, 406, and the one or more leg leads 408 may be connected to various components of the mobile training lab 100 during training to simulate touchpoints between a lineman and the power equipment. The lineman meter 400 may have an internal resistance that approximates the resistance of the human body. For example, the lineman meter 400 may comprise a 1000 Ohm resistor. With the lineman meter positioned, the mobile training lab 100 may be energized. In some embodiments, energizing the mobile training lab 100 may be accomplished using the controls 412 on the lineman meter 400. In some embodiments, the controls 412 comprise a tablet including a touchscreen, although other types of controls are possible. The lineman meter 400 can include a cord 410 that connects the lineman meter 400 to the mobile training lab 100 for power or data transmission. In some embodiments, cord 410 can be omitted and the lineman meter 400 can be battery powered and/or wireless.

When the lab 100 is energized, indicators 414, 416 can light up to indicate whether the lineman meter 400 is in a safe or a dangerous situation. For example, the indicator 414 can light up green to indicate that the lineman meter 400 is in a safe (e.g., appropriately grounded) situation, while the indicator 416 can light up red to indicate that the lineman meter 400 is in a dangerous (e.g., incorrectly grounded) situation.

In some embodiments, the lineman meter 400 is configured to include a heartbeat display and/or speaker to provide an indication of a heartbeat of a lineman. This can be configured to make training more impactful as the heartbeat can stop or flat line when the lineman meter is improperly grounded and thus exposed to dangerous and potentially fatal electric shock. In some embodiments, the lineman meter 400 can have the appearance of a lineman to further increase the impact of the training.

Example Training Methodologies

Figure 22:
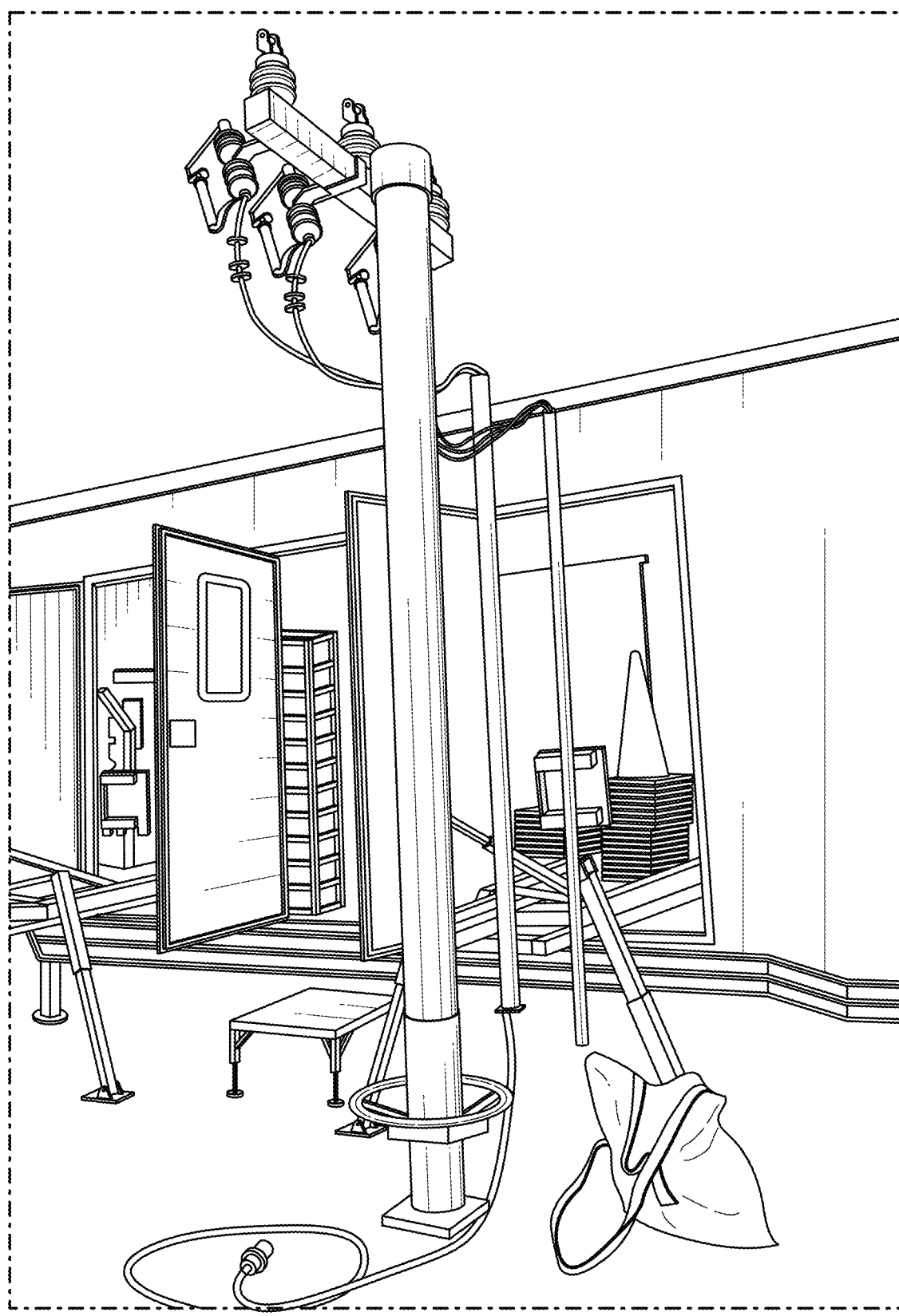
FIGS. 22-24 illustrate example steps in an EPZ training scenario, according to an embodiment.
Figure 23:
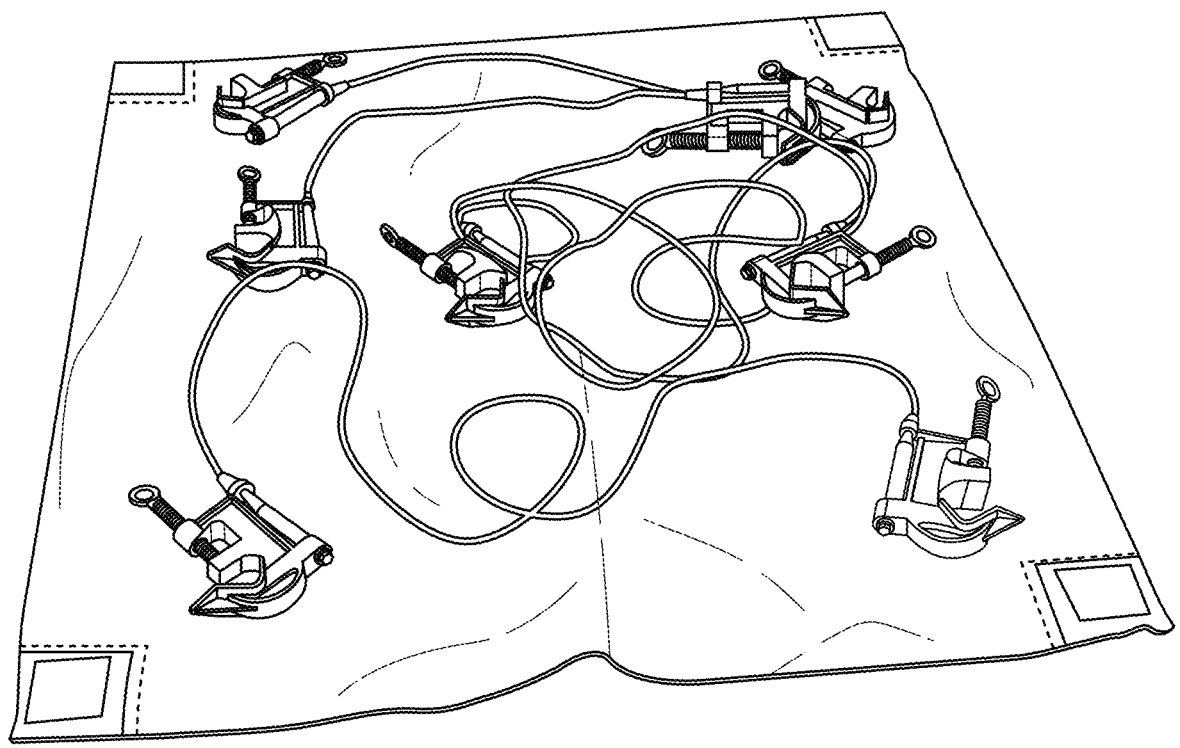

FIGS. 22-34 illustrate example steps in a training methodology implemented using the training lab 100. The illustrated example shows an EPZ training performed on the overhead side of the training lab 100, where the training lab 100 is configured to be mobile. Similar training can be performed on a stationary or non-mobile version of the training lab 100. The training can begin with the training lab 100 in the deployed configuration. For example, as shown in FIG. 22, the power pole assemblies can be deployed from the interior of the trailer. As shown in FIG. 23, a plurality of connection cables can be provided. These can be similar to those that are used in the field. During training, these will be used to establish an EPZ, which will then be tested.

Figure 24:
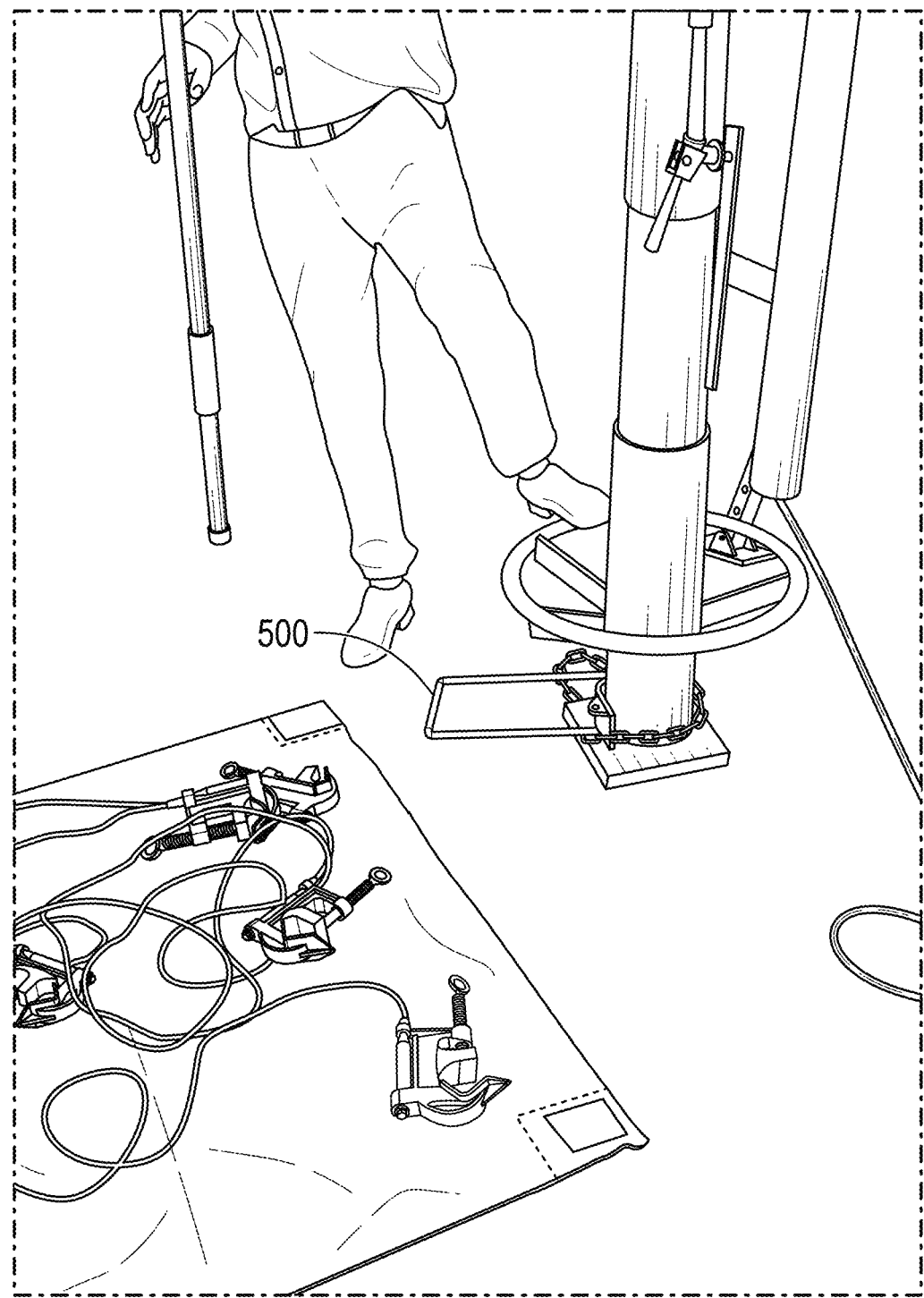
Figure 25:
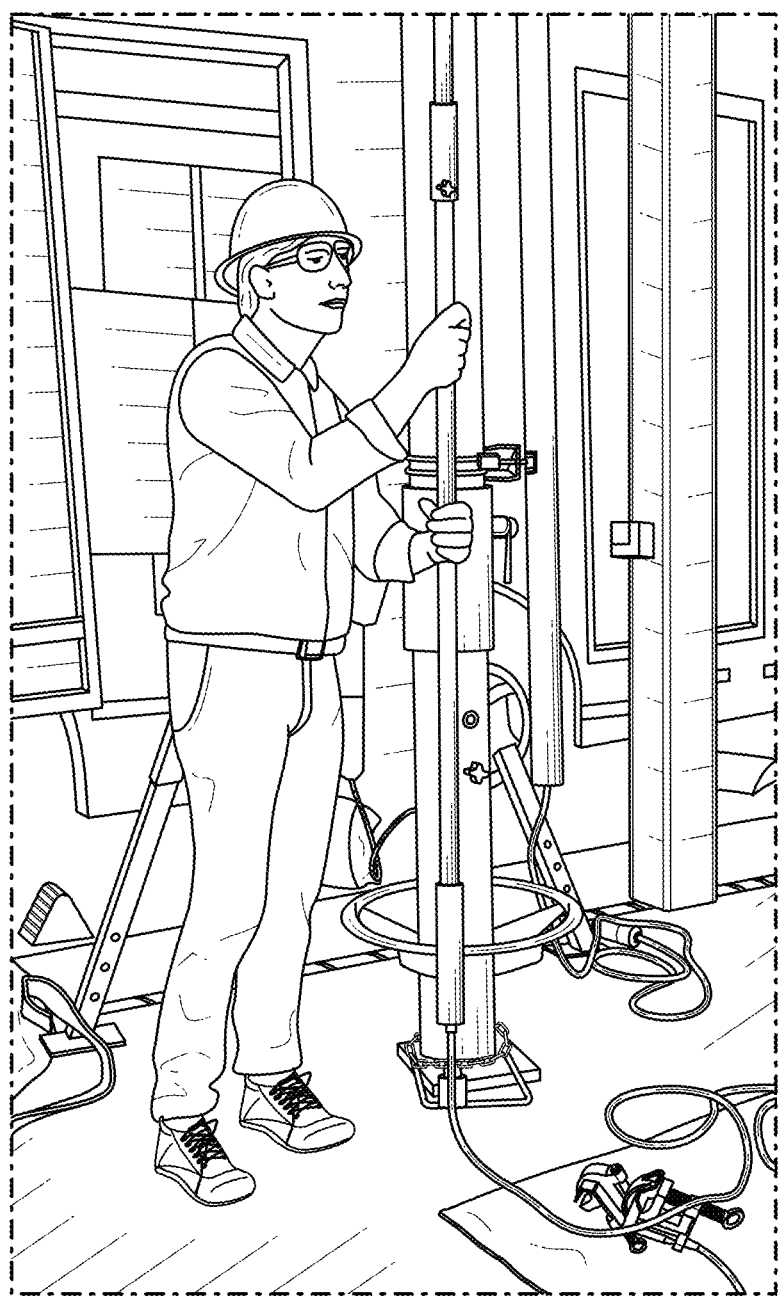
FIGS. 25 and 26 illustrate connection of the connection cables using a hot stick, according to an embodiment.
Figure 26:
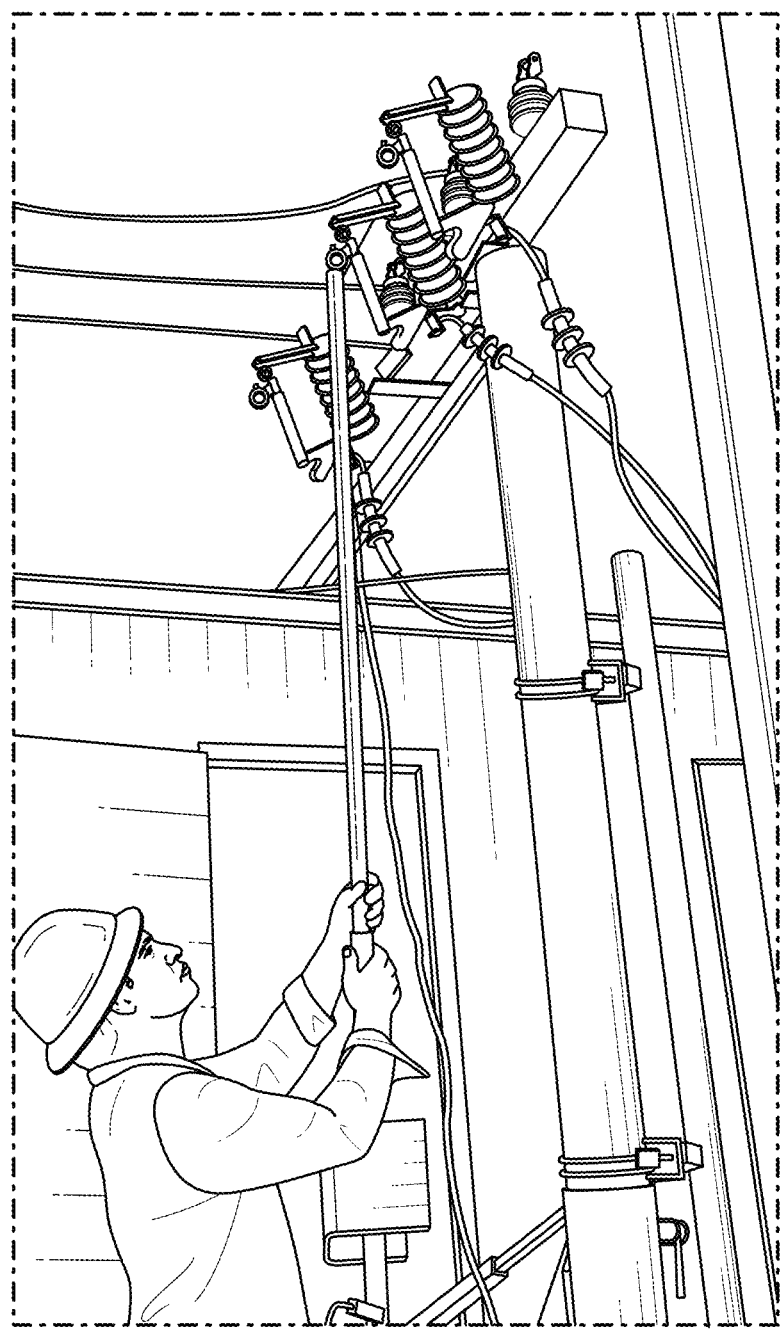
Figure 27:
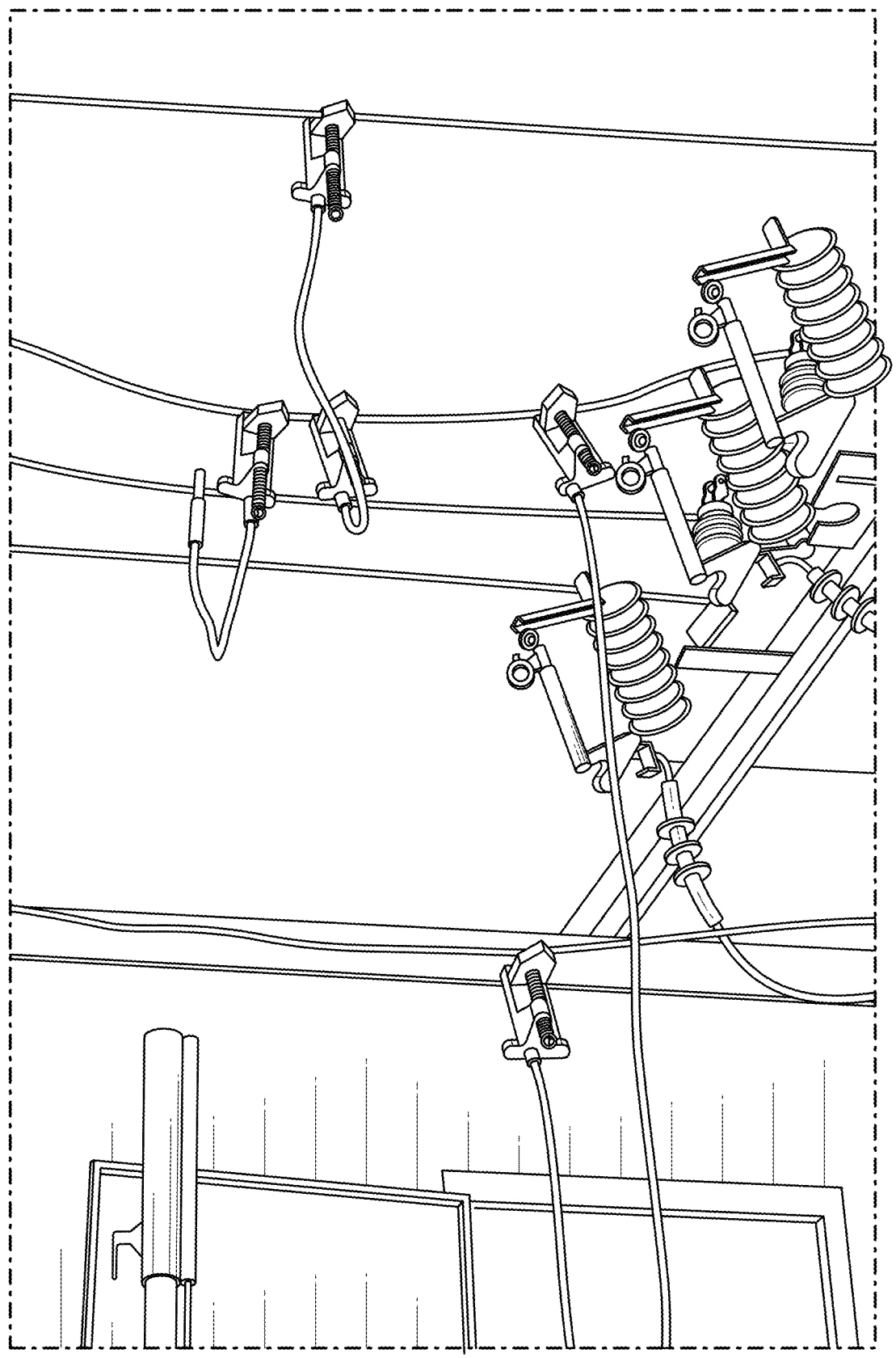
FIG. 27 illustrates the connection cables in place, according to an embodiment.

FIG. 24 illustrates that a grounding connection 500 can be attached to the power pole assembly. In the illustrated embodiment, the grounding connection 500 is attached to the foot of the power pole assembly, below the support ring on which the trainee can stand during the training. Using a hot stick, the trainee can attach the connection cables between the ground and the overhead powerlines to set up an EPZ. In some embodiments, the hot stick can comprise an electrically insulating dielectric material. The hot stock can be configured to electrically isolate the user from a potential difference and any associated flow of current. FIG. 25 illustrates an example of connecting one end of a connection cable to the grounding connection 500. FIG. 26 illustrates an example of connecting the opposite end of the connection cable to one of the power lines. FIG. 27 illustrates some of the connections between the power lines as well as additional connections running down to the grounding connection 500. In some embodiments, the trainee makes all of these connections using the hot stick while standing on the support ring of the power pole assembly. During the training, the trainee can set up a grounding situation (such as an EPZ) that they believe will protect them in the case of a fault current. In some embodiments, the EPZ is a zone of constant voltage within which a person is protected from electrical current.

Figure 28:
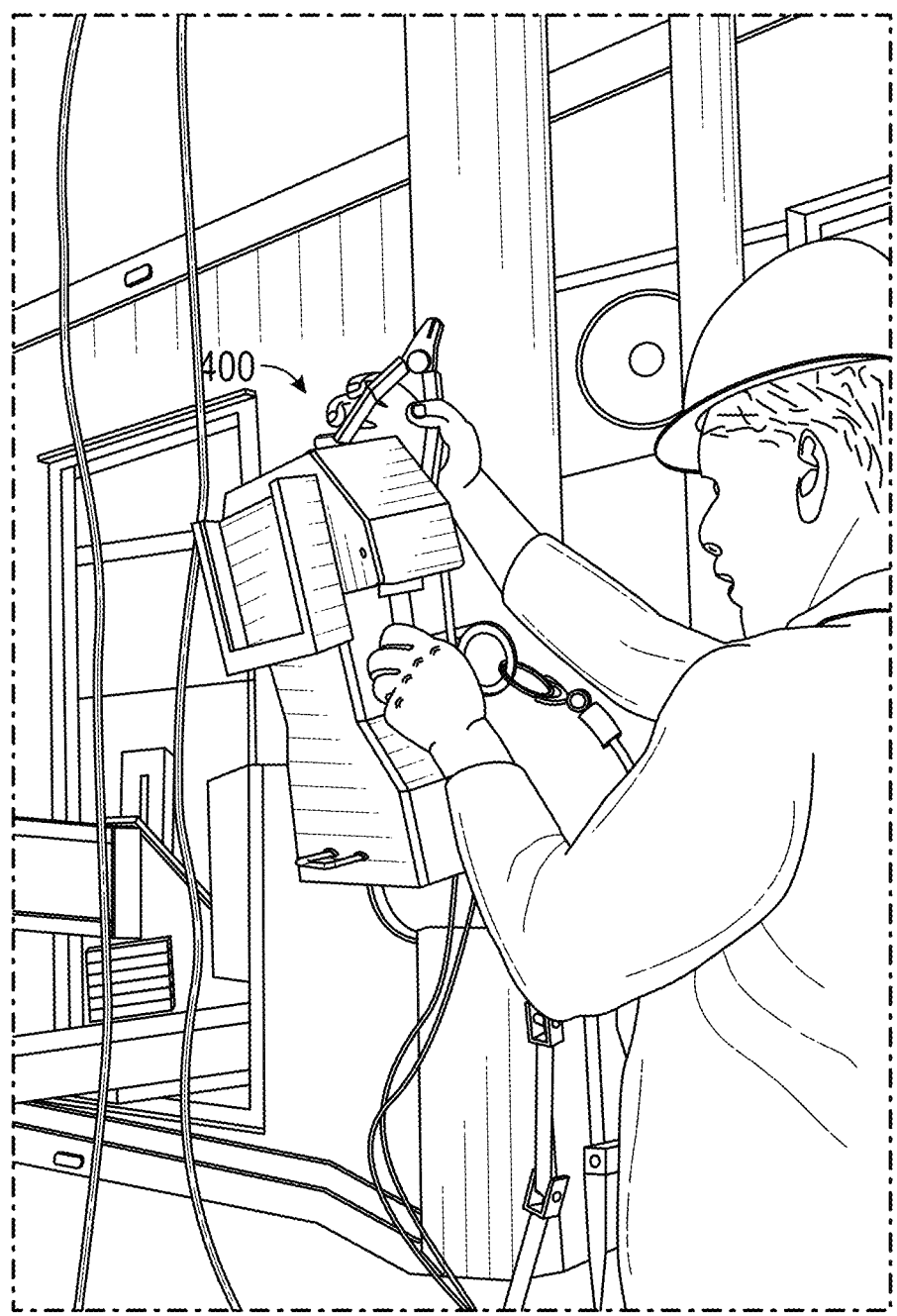
FIG. 28 illustrates example installation of a lineman meter that simulates the trainee and is used to evaluate the EPZ set up by the trainee.
Figure 29:
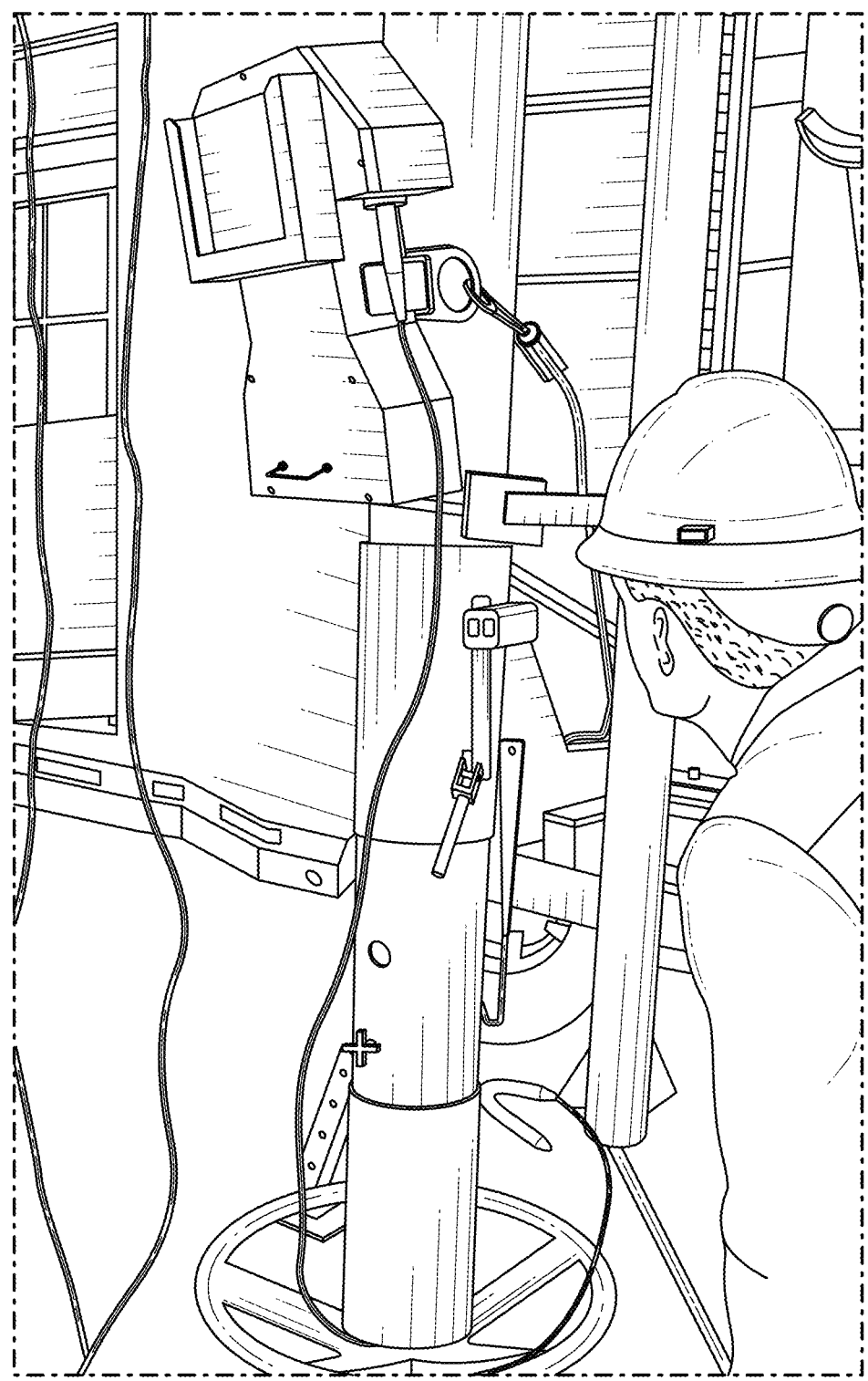
FIGS. 29 and 30 illustrate connections of leads of the lineman meter. These can simulate where the trainee would be touching in a real-world scenario.
Figure 30:
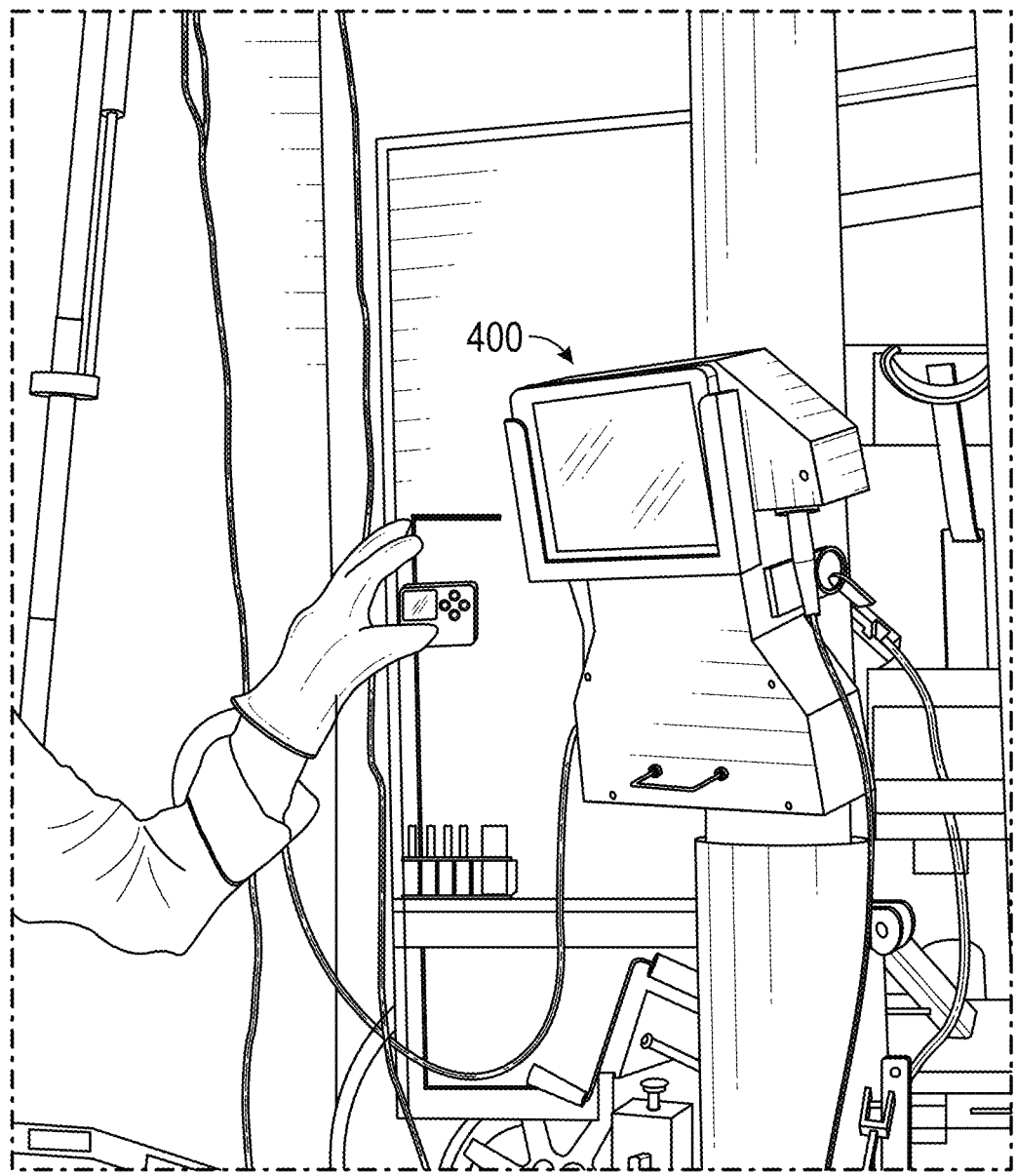
Figure 31:
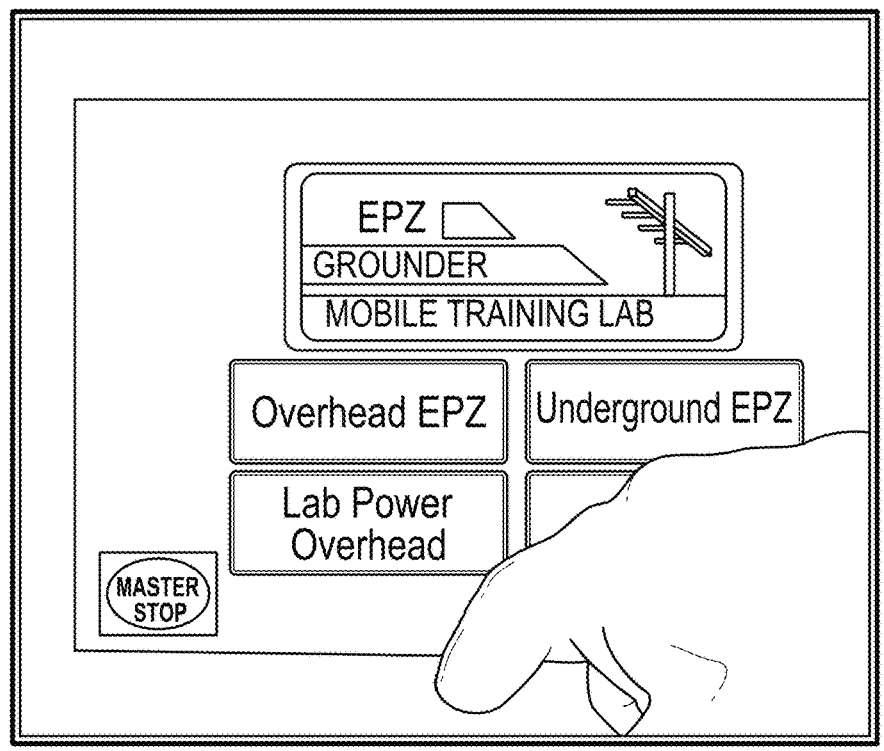
FIGS. 31 and 32 illustrate example controls for energizing and testing the EPZ using the lab.

FIGS. 28-34 illustrate how the grounding situation can be evaluated. As shown in FIG. 28, a lineman meter 400 (which can be similar to that described above with reference to FIG. 21, can be connected to the power pole assembly. The lineman meter 400 is configured to physically simulate the presence of the trainee, and as will be discussed below, can measure whether a fatal fault current would pass through the trainee. As shown in FIG. 29, a grounding cable of the lineman meter 400 can be connected to ground. As shown in FIG. 30, an additional cable can be positioned between the lineman meter 400 and the power lines above on which the trainee is working. These leads that extend from the lineman meter 400 can simulate the arms and legs of the trainee as if they were suspended on the pole and working on the power lines. A resistor approximating the resistance of human (e.g., a 1000 Ohm resistor) can be included in the lineman meter 400 between the two leads.

With the lineman meter positioned, the training lab 100 can now run a test to evaluate the grounding situation set up by the trainee. In some embodiments, the training lab 100 can be operated using a tablet that can be attached to the lineman meter (e.g., as shown in FIG. 30). The tablet can be connected to the training lab 100 (e.g., via Bluetooth or other wireless connections).

Figure 32:
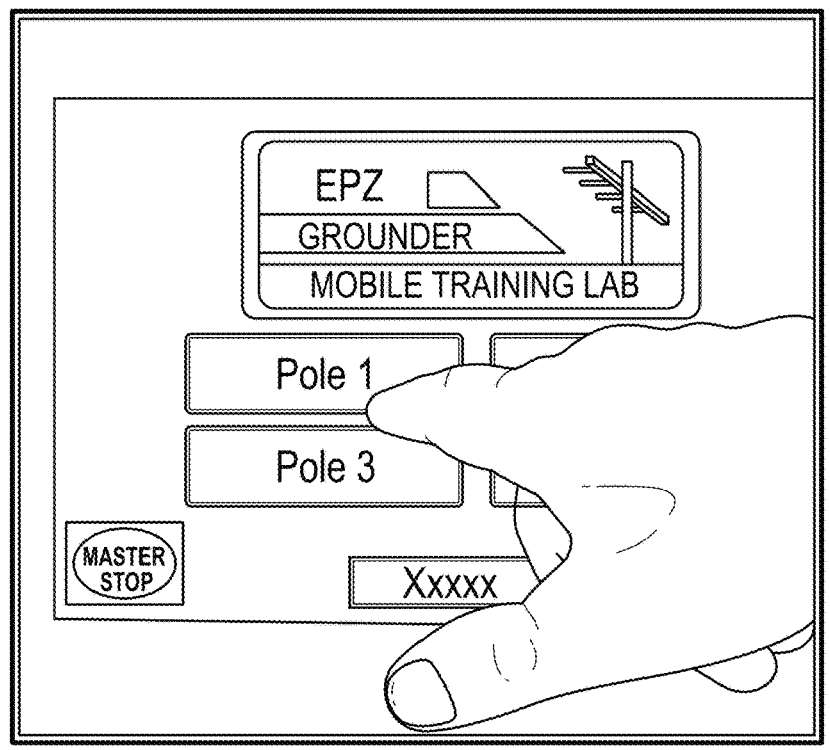
Figure 33:
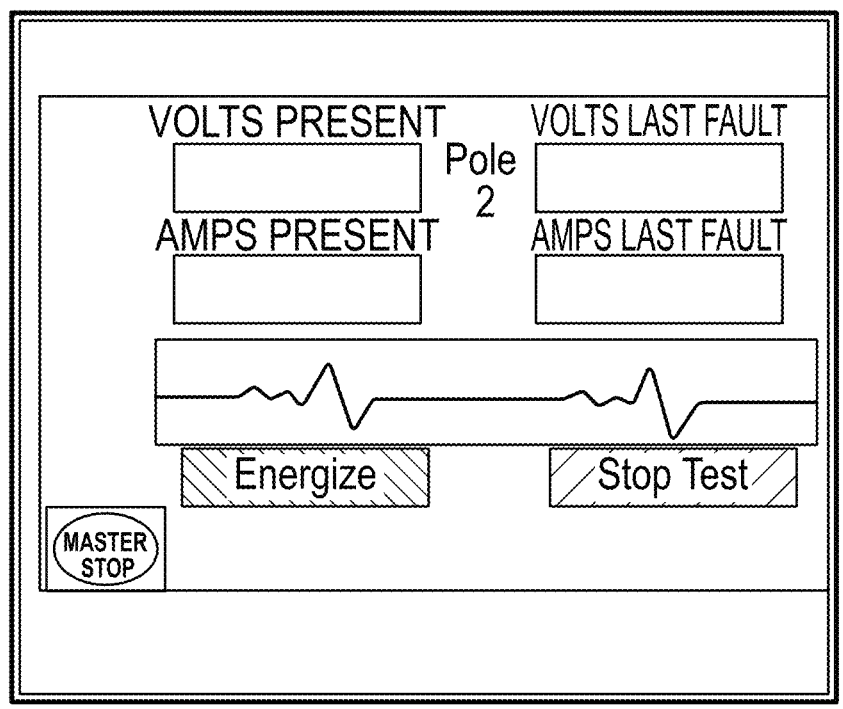
FIGS. 33 and 34 illustrate test result outcomes, according to an embodiment.
Figure 34:
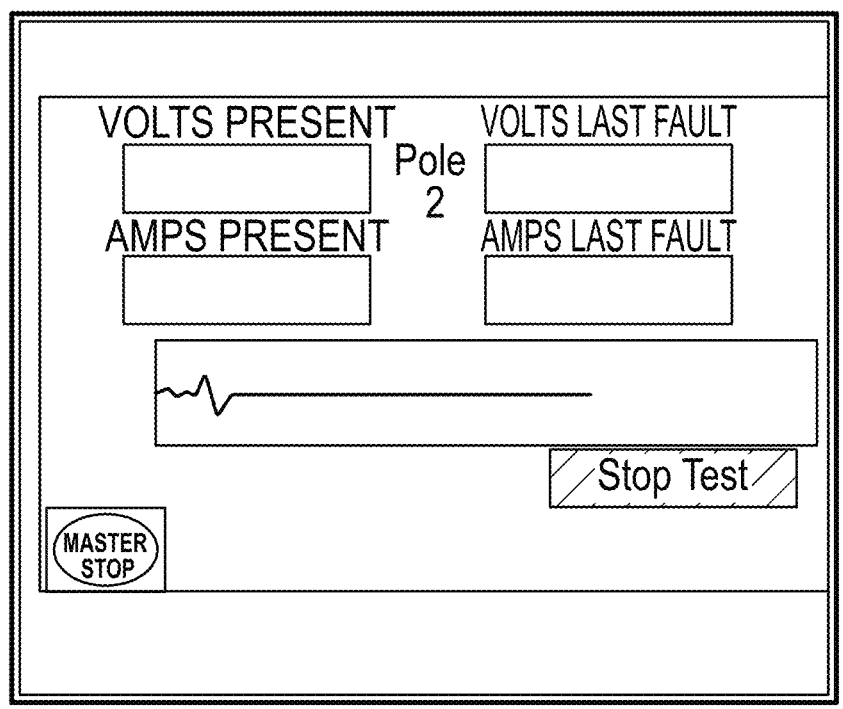

FIGS. 31-34 illustrate examples controls. For example, in FIG. 31, the test to be run can be selected. For example, in this instance "Overhead EPZ" can be selected because the trainee has endeavored to set up a EPZ on the overhead side of the lab. In FIG. 32, the pole to be tested can be selected. In FIG. 33, the lab is energized. The lineman meter 400 measures whether a fatal fault current passes therethrough (which would be the case in the event that the EPZ is not set up correctly). If no fatal current is detected, a heartbeat can be displayed (e.g., as shown in FIG. 33) to illustrate the EPZ has been correctly set up and has protected the trainee from a fatal fault current. If the EPZ is not set up correctly and a fatal fault current is detected, the heartbeat can flat line, illustrating that the trainee would have died or been severely injured due to the improperly set up EPZ. In this way, trainees can safely set up and test different grounding conditions and understand the real-world impacts safely.

Figure 35:
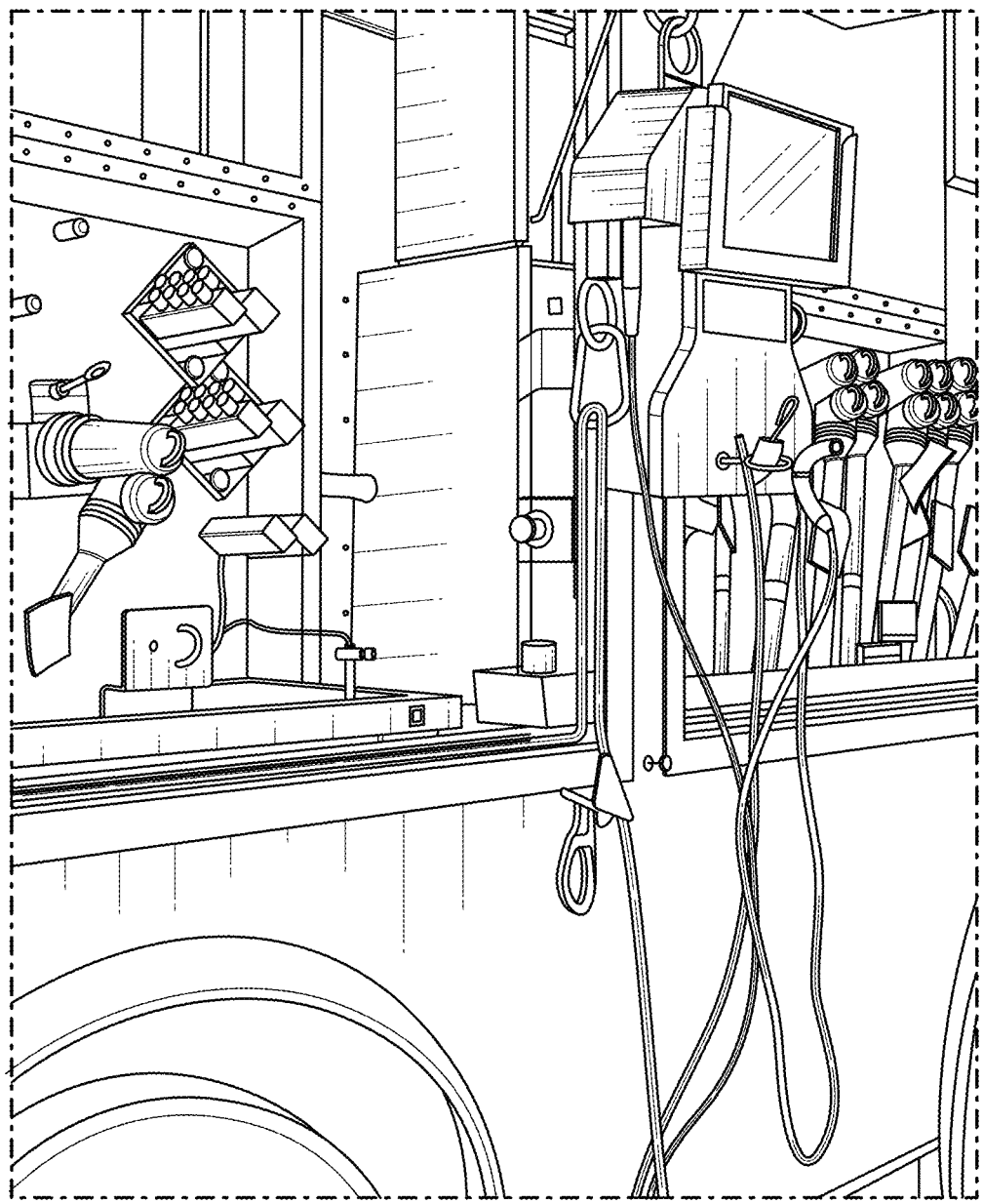
FIG. 35 illustrates the lineman meter installed on the underground side of the trailer for EPZ and switching training.

FIG. 35 illustrates that the lineman meter 400 can similarly be used on the underground side of the training lab 100. In these cases, the training lab 100 can be used for EPZ training and switching training.

Figure 36:
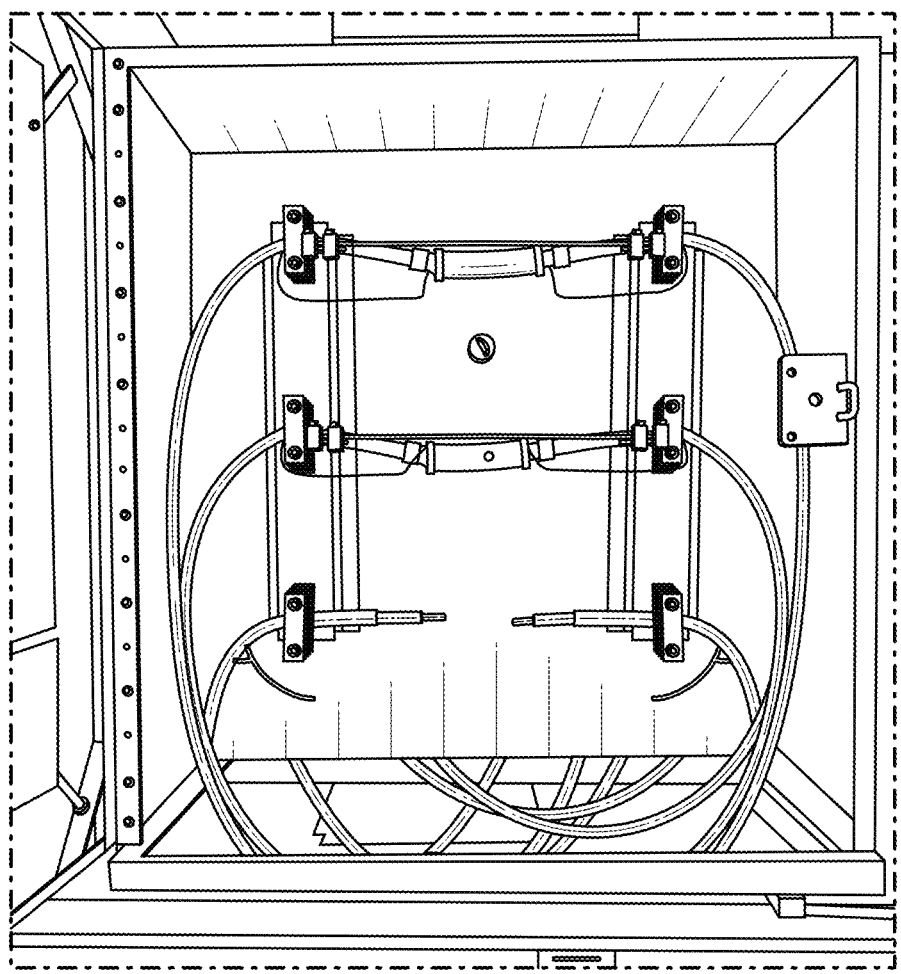
FIG. 36 illustrates an example splice cabinet.

FIG. 36 illustrates an example splice cabinet that can be included on the underground side of the trailer. The splice cabinet is configured with an "in progress" splice connection which can be used to simulate what will occur in the event of a fault current mid-splice.

From the foregoing description, it will be appreciated that inventive training labs are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately." "about." "generally," and "substantially" may refer to an amount that is within less than or equal to 10% of, within less than or equal to 5% of, within less than or equal to 1% of, within less than or equal to 0.1% of, and within less than or equal to 0.01% of the value amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A training lab for providing EPZ grounding training, the training lab comprising:
    at least one portable power pole assembly configured to support a power line, wherein the at least one portable power pole assembly is extendable and retractable and wherein the at least one portable power pole assembly is electrically isolated from the training lab;
    a portable three-phase power source configured to selectively energize the power line; and
    a lineman meter configured for use during EPZ grounding training, the lineman meter comprising:
        an arm lead;
        a leg lead;

an internal resistor positioned between the arm lead and the leg lead and that represents a resistance of a human body; and at least one indicator configured to indicate proper or improper grounding determined through detection of a current that represents a fatal shock.

2. The training lab of claim 1, wherein the lineman meter is configured to be attached to the power line and the at least one portable power pole assembly using the arm lead and the leg lead to provide EPZ grounding training.

3. The training lab of claim 1, wherein the at least one portable power pole assembly further comprises a foot portion comprising a support ring configured to support a trainee above ground.

4. The training lab of claim 1, further comprising a cross-arm configured to couple to a top of the at least one portable power pole assembly, the cross-arm configured to receive and support one or more power lines.

5. The training lab of claim 1, wherein further comprising:
a towable trailer comprising a body having a plurality of walls at least partially defining a hollow interior, an axle having at least two wheels disposed thereon to support the body, and a tow hitch; and
the at least one portable power pole assembly is configured to transition between a stowed configuration positioned within the hollow interior and a deployed configuration in which a portable power pole of the at least one portable power pole assembly is deployed adjacent to the towable trailer for providing EPZ grounding training.

6. The training lab of claim 5, where the at least one portable power pole assembly comprises:
a slide extension assembly mounted within the hollow interior and configured to slide out an access location in the deployed configuration;
a pivot assembly comprising a hinge attached to the slide extension assembly; and
an extendible pole assembly attached to the hinge of the pivot assembly.

7. The training lab of claim 6, wherein the pivot assembly is configured to allow the extendible pole assembly to pivot between an inclined storage configuration and a vertical deployed configuration.

8. The training lab of claim 6, wherein the extendible pole assembly comprises an outer pole and an inner pole telescopingly arranged therein.

9. The training lab of claim 6, wherein the pivot assembly further comprises an insulated coupling that couples the extendible pole assembly to the slide extension assembly and electrically insulates the extendible pole assembly from a remainder of the training lab.

10. The training lab of claim 5, wherein the at least one portable power pole assembly comprises four portable power pole assemblies arranged on an overhead training side of the towable trailer.

11. The training lab of claim 10, further comprising an underground training side positioned on an opposite side of the towable trailer.

12. The training lab of claim 11, wherein the underground training side comprises at least one of:
a single-phase transformer;
a three-phase transformer;
a three-phase load-break junction box;
a three-phase splice cabinet; and
a live front switch.

13. A training lab for providing EPZ grounding training, the training lab comprising:
at least one cabinet comprising a single-phase or a three-phase transformer, wherein the at least one cabinet is electrically isolated from other cabinets;
a portable three-phase power source configured to selectively energize the single-phase or the three-phase transformer; and
a lineman meter configured for use during EPZ grounding training, the lineman meter comprising:
an arm lead;
a leg lead;
an internal resistor positioned between the arm lead and the leg lead and that represents a resistance of a human body; and
at least one indicator configured to indicate proper or improper grounding determined through detection of a current that represents a fatal shock.

14. The training lab of claim 13, further comprising additional cabinets comprising at least one of:
a single-phase transformer;
a three-phase transformer;
a three-phase load-break junction box;
a three-phase splice cabinet; and
a live front switch.

15. The training lab of claim 14, wherein the cabinets are provided on an underground side of a towable trailer configured to provide EPZ grounding and switching training.

16. The training lab of claim 15, further comprising an overhead training side positioned on an opposite side of the towable trailer.

17. The training lab of claim 16, wherein the overhead training side comprises at least one portable power pole assembly configured to transition between a stowed configuration positioned within a hollow interior and a deployed configuration in which a power pole of the at least one portable power pole assembly is deployed adjacent to the towable trailer for providing EPZ grounding training.

18. The training lab of claim 17, where the at least one portable power pole assembly comprises:
a slide extension assembly mounted within the hollow interior and configured to slide out an access location in the deployed configuration;
a pivot assembly comprising a hinge attached to the slide extension assembly; and
an extendible pole assembly attached to the hinge of the pivot assembly.

19. The training lab of claim 18, wherein the at least one portable power pole assembly comprises four portable power pole assemblies arranged on the overhead training side of the trailer.

* * * * *